(12) United States Patent
Hagberg

(10) Patent No.: US 12,453,341 B1
(45) Date of Patent: *Oct. 28, 2025

(54) RETRACTABLE SPRAY SHIELD FOR AGRICULTURAL USE

(71) Applicant: Mark T. Hagberg, Lafayette, MN (US)

(72) Inventor: Mark T. Hagberg, Lafayette, MN (US)

( * ) Notice: Subject to any disclaimer, the term of this patent is extended or adjusted under 35 U.S.C. 154(b) by 390 days.

This patent is subject to a terminal disclaimer.

(21) Appl. No.: 18/045,463

(22) Filed: Oct. 10, 2022

Related U.S. Application Data

(63) Continuation-in-part of application No. 16/655,224, filed on Oct. 16, 2019, now Pat. No. 11,465,164, which is a continuation-in-part of application No. 15/968,728, filed on May 1, 2018, now Pat. No. 10,464,080, which is a continuation-in-part of application No. 15/407,229, filed on Jan. 16, 2017, now Pat. No. 10,315,211.

(60) Provisional application No. 63/287,035, filed on Dec. 7, 2021, provisional application No. 62/492,567, filed on May 1, 2017.

(51) Int. Cl.
 *A01M 7/00* (2006.01)
(52) U.S. Cl.
 CPC ........ *A01M 7/0064* (2013.01); *A01M 7/0042* (2013.01)
(58) Field of Classification Search
 CPC .......... B05B 12/24; B05B 12/20; B05B 1/20; B05B 1/28; B05B 13/005; B05B 12/34; B05B 12/36; A01M 7/0042; A01M 7/0064; A01C 23/00–047; A01D 2101/00; A47K 3/281; B08B 1/00; A45B 25/165
 USPC ......... 239/288–288.5, 103, 77, 78, 159–170, 239/176, 150, 726–733, 754
 See application file for complete search history.

(56) References Cited

U.S. PATENT DOCUMENTS

| | | | |
|---|---|---|---|
| 6,273,111 B1 * | 8/2001 | Weiss ................... | A45B 25/143 135/25.41 |
| 2016/0121355 A1 * | 5/2016 | Claussen ............... | B05B 13/005 239/164 |

* cited by examiner

*Primary Examiner* — Arthur O. Hall
*Assistant Examiner* — Juan C Barrera
(74) *Attorney, Agent, or Firm* — Albert W. Watkins

(57) ABSTRACT

A retractable spray shield for agricultural use has a spray barrier; a two-part storage tube; a deployment and concealment drive having a motor, a drive shaft, and a quadrilateral linkage that in one direction deploys the spray barrier from the storage tube and in a second opposed direction conceals the spray barrier within the storage tube. The quadrilateral linkage is defined by a rotating arm; a pushing arm coupled to the drive shaft; the bottom of a unit storage tube, and a transfer arm supporting the spray barrier. The spray barrier has a generally triangular and flaccid liquid barrier film, a pair of framing legs coupled to opposed edges of the liquid barrier film, and a spring configured to operatively stretch the pair of framing legs apart from each other and thereby expand the barrier film toward a planar, generally triangular geometry when deployed.

10 Claims, 19 Drawing Sheets

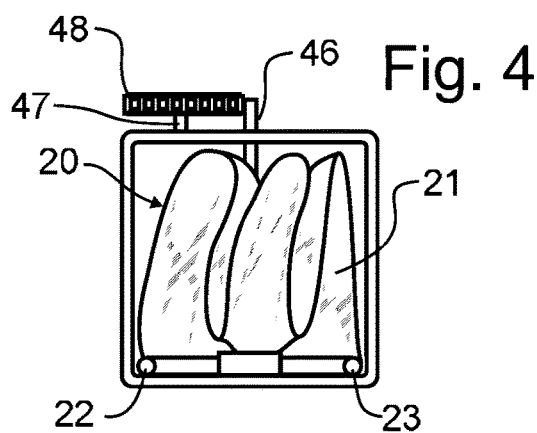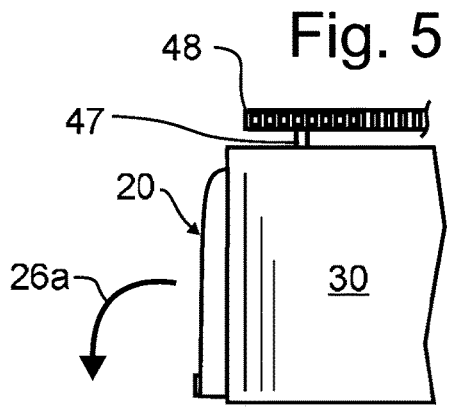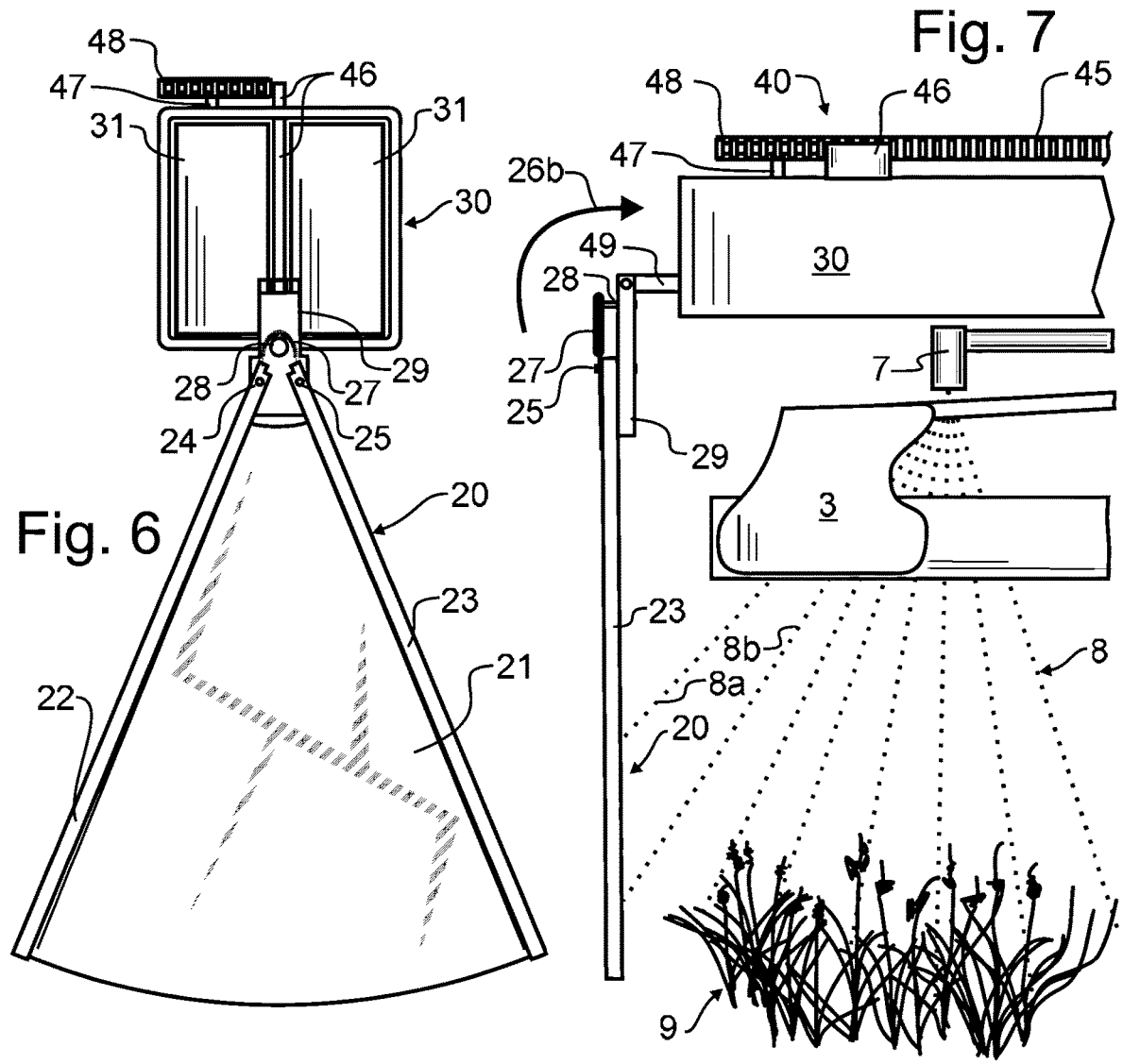

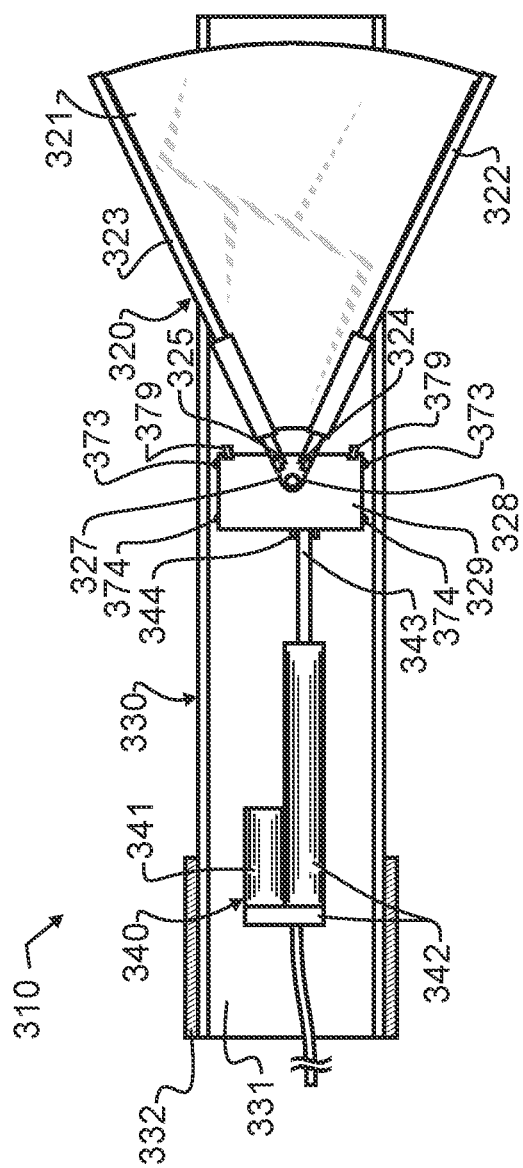
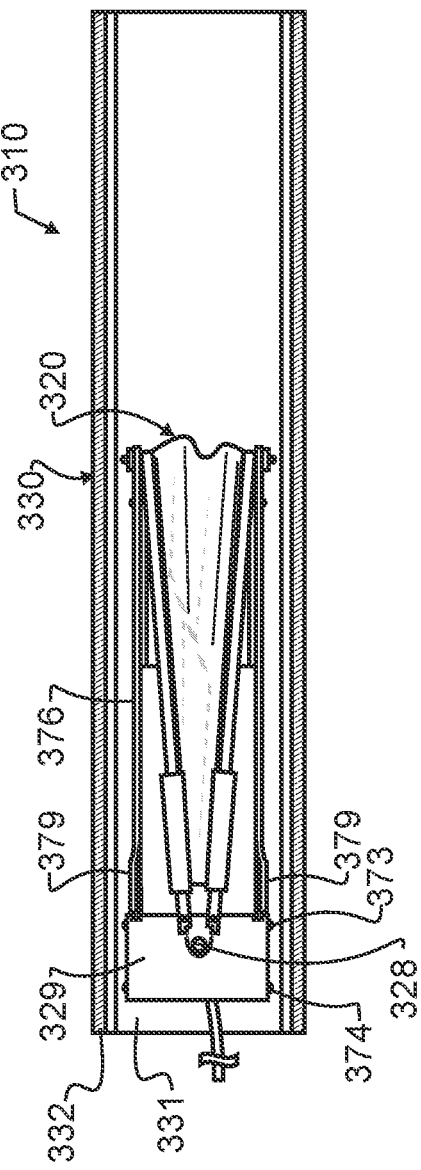

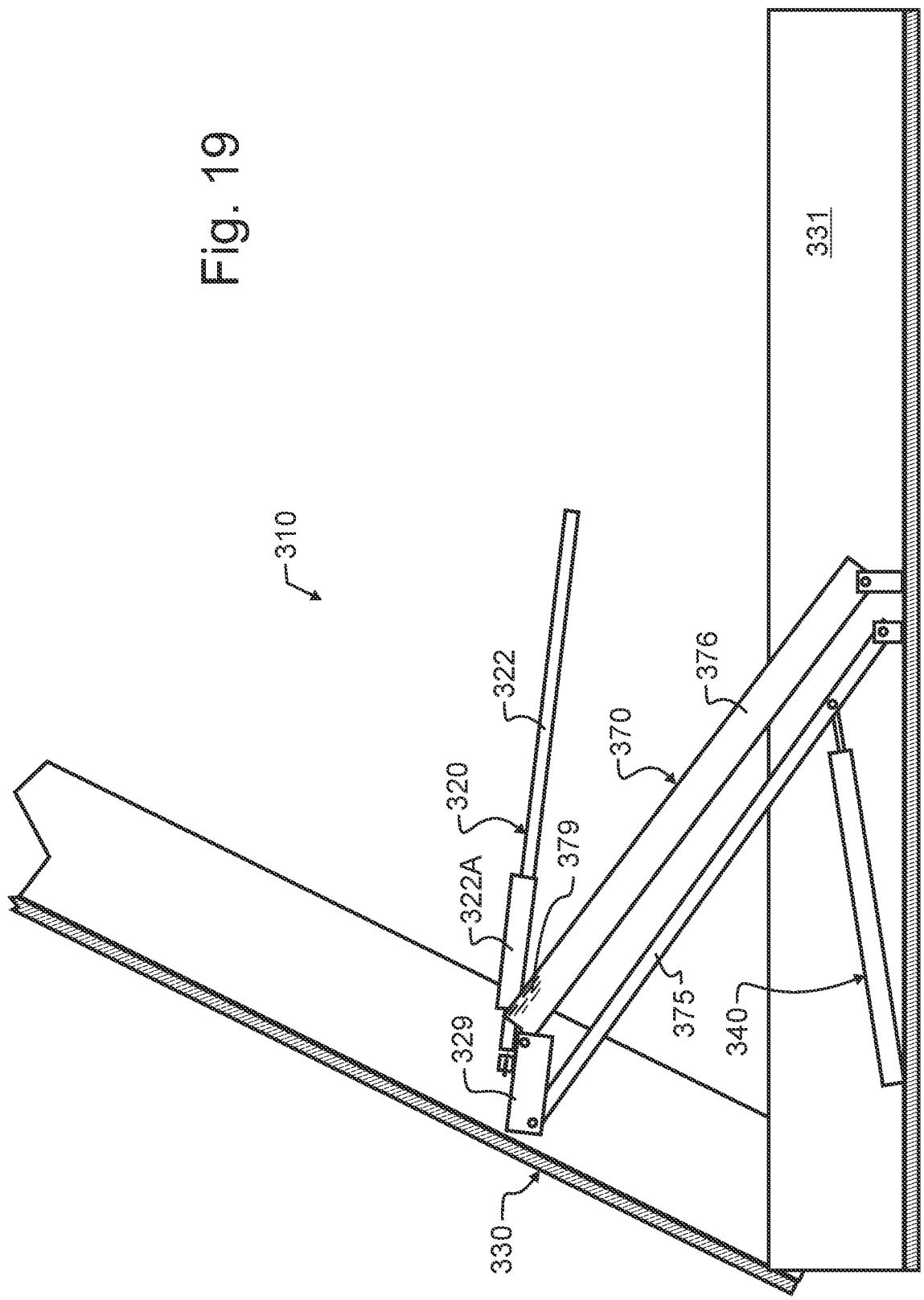

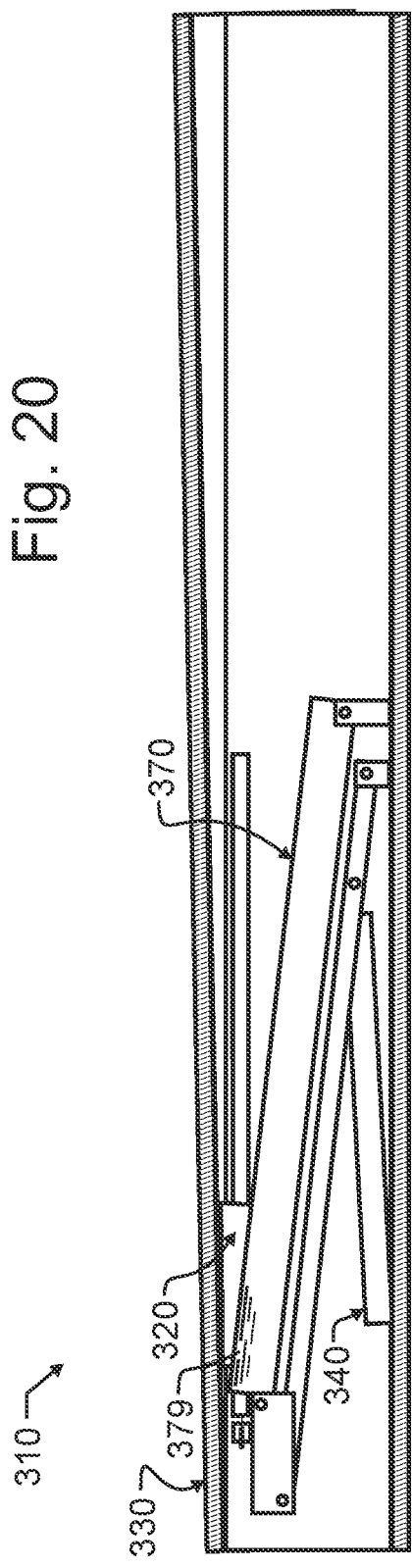
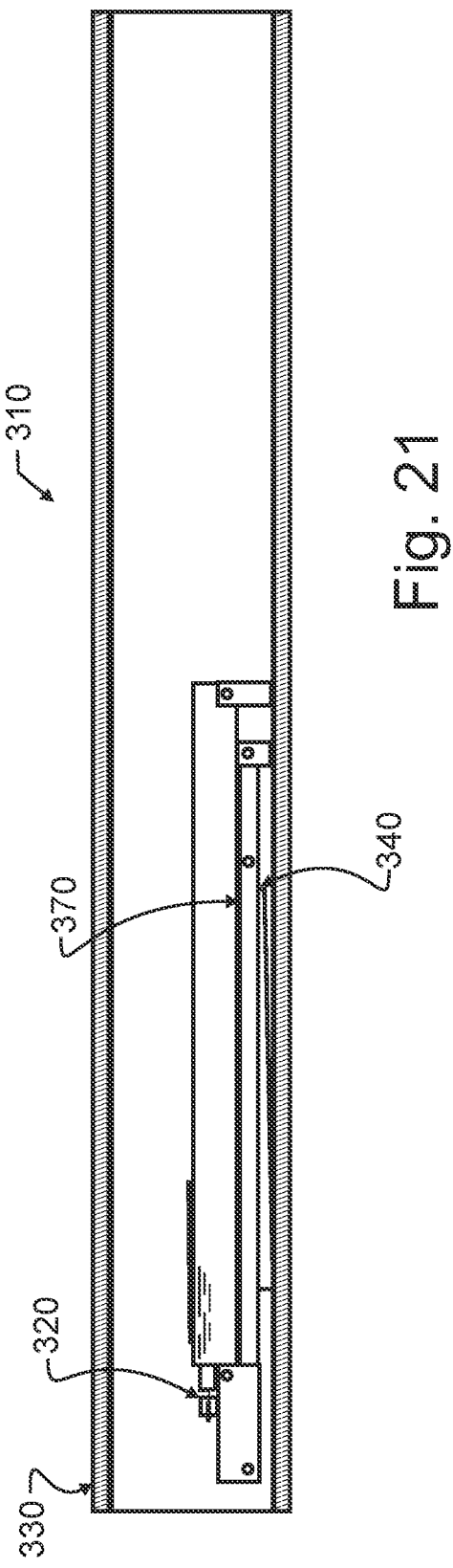

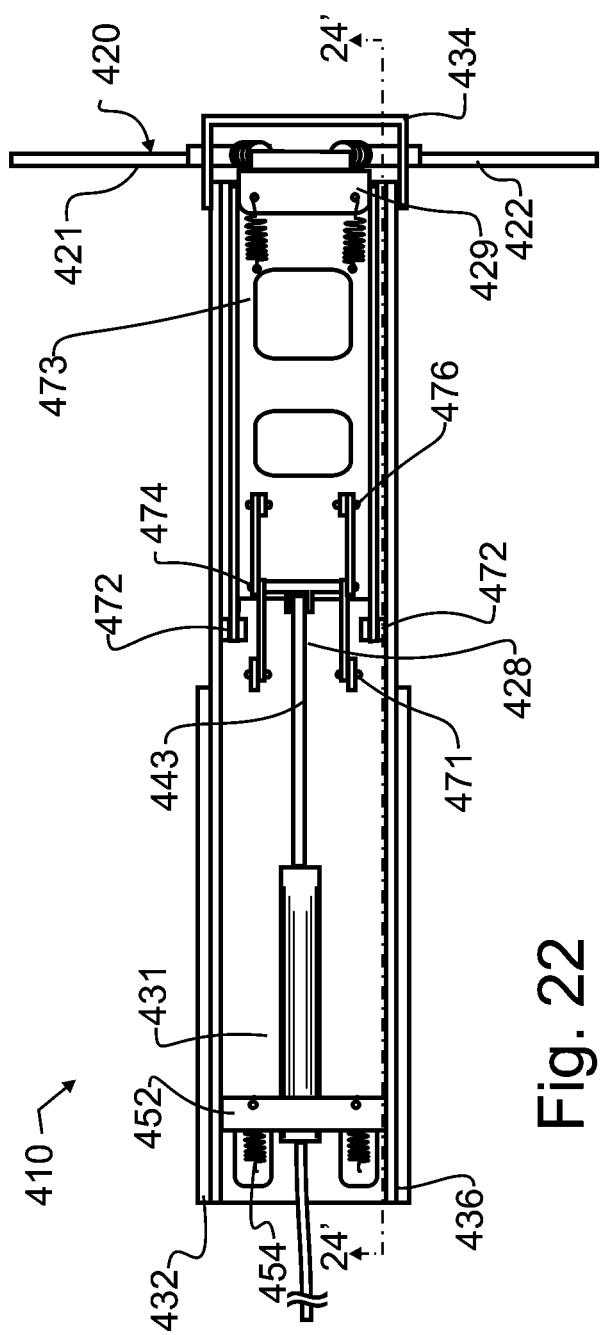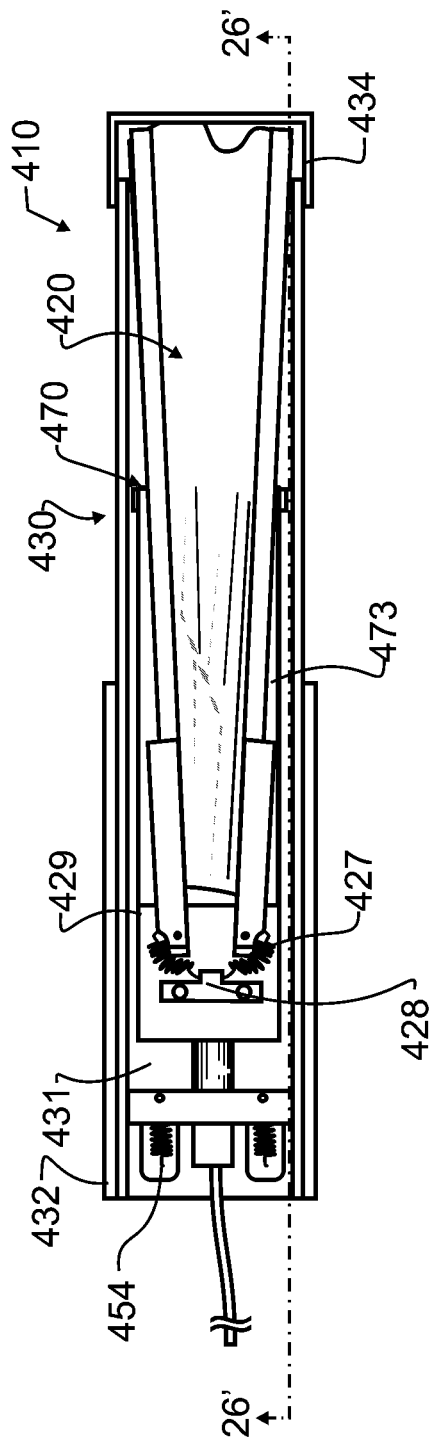

RETRACTABLE SPRAY SHIELD FOR AGRICULTURAL USE

BACKGROUND OF THE INVENTION

1. Field of the Invention

The present invention pertains generally to fluid spraying, and more particularly to a retractable spray shield for agricultural use that deflects the flow from at least one spray nozzle.

2. Description of the Related Art

Modern agriculture has for most of a century advanced in productivity more than many other industries. Most consumers are generally unaware of these significant advances. However, the consumer has benefitted greatly, in particular because of the lower-than-inflation price changes in many agricultural products through this long time period. Most agricultural operations today incorporate extremely technically advanced machinery, seed, and chemicals that allow one person to do the work that even only a few decades ago required many. One particularly common and exemplary machine is the tractor, which has increased greatly in size, power, and in the many diverse attachments that are used to facilitate operations.

The commercial production of many agricultural crops involves the spraying of one or more chemicals such as herbicides, fertilizers, insecticides, or fungicides. The products being sprayed may be used to improve the health of the desired crop, or to eliminate or reduce detrimental interaction with diseases, pests, and competing weeds. To reduce the time required to apply these products to the crop, very large sprayers have been produced that carry a large liquid tank, a pump having a fluid inlet coupled into the liquid tank, at least one boom arm typically extending generally transversely to the direction of travel, and a plurality of spray nozzles supported by the boom and coupled through liquid supply lines to the pump outlet. The sprayer may be an attachment to a tractor, or an entirely separate machine. A person operating the sprayer will typically be able to control the pump to turn on or off the spray, and in many cases to control the pump pressure, which in turn controls the rate of delivery of the liquid to the crop. Through the use of this equipment, spraying of liquid chemicals is both time efficient and controllable to the needs of a particular crop, field, or even location within a field. As a result, a relatively precise amount of chemical may be applied rapidly to a large area.

As may be appreciated, the quantity of spray delivered to a crop can be relatively precisely controlled beneath the boom. When multiple passes are made across a field, for each pass the end of the boom arm can be located offset by the right amount from the previous pass to provide just the right amount of overlap in the spray coming out beyond the end of the boom. However, the sprayer will only pass over the edges of the field once. Consequently, adjacent to the edges of the field a tractor operator will normally make sure the last row of crop will be under the last sprayers, to ensure adequate liquid is delivered to this final row. Unfortunately, this also means that spray will be delivered beyond the last row of crop, typically on to adjacent plants. As may be appreciated, these adjacent plants are not a part of the desired crop, and so may include an adjacent field containing a different crop, a grass covered ditch, a neighboring property under different ownership, or undesirable weeds.

In the case of the application of an herbicide with the overspray falling onto a different crop, a grass covered ditch, or a neighboring property, those adjacent plants undesirably may be killed or seriously harmed by the spray. In the case of undesirable weeds, and since these weeds are not immediately under the boom and are instead being treated with overspray, the concentration of application is generally less than that intended for application to the field. As a result, the overspray may not be sufficient to kill the weeds, and so may instead lead to the development of weeds resistant to the spray. These weeds may then encroach upon the desired crop, hurting the yield or value of the harvested crop. Similar deficiencies may be encountered in the case of insecticides and fungicides, such as where adjacent insects may develop insecticide resistance. In the case of a fertilizer overspray, adjacent weeds may be undesirably strengthened and stimulated. Consequently, and for a variety of reasons, it is desirable to reduce or eliminate overspray adjacent to the edges of a field, while not interfering with the spray within the middle of the field.

To reduce the overspray, artisans have designed various shields that are designed to enclose a single row of crop. The spray nozzles are mounted to spray into the interior of the shield, and thereby avoid spray into the between row spaces and to prevent overspray. Exemplary U.S. patents and published applications, the teachings which are incorporated herein by reference, include: 3,445,961 by Elsworth, entitled "Agriculture spraying machines", which illustrates a pair of plastic guides that gently squeeze the plants together, and a liquid that is sprayed interior of the guides into the squeezed plants; and 4,947,581 by Claussen et al, entitled "Spray shield assembly", which illustrates a set of shields in the general shape of an upside-down "U" channel open on both ends but closed on the top and sides. For some applications, such as that of a fertilizer, either of these apparatus will reduce or avoid undesirable overspray on to other plants besides the agricultural crop. However, for other liquid applications, particularly herbicide applications, the entire field needs to be sprayed, making these shields useless for such applications. Furthermore, these shields must be set for a particular row spacing, meaning they will typically require resetting for each different species of crop. The variable height of different species and different stages of maturity are also challenging. Finally, there are many times when a spray will be most effectively sprayed by nozzles spraying at an angle closer to parallel to the ground than perpendicular thereto. Spray from relatively more horizontally pointing nozzles that misses the immediately adjacent row of crop, such as when the spray nozzle is pointing between sequential plants in a row, may still end up being applied to plants in a nearby row. In the case of a shield such as illustrated by either Elsworth or Claussen et al, any spray that misses the plant will instead be applied only to the shield, and from there will drip onto the soil without ever contacting the plant.

Additional U.S. patents illustrate fixed shields for crops, the relevant teachings and contents which are incorporated herein by reference, including: 2,589,020 by North, Jr, entitled "Spraying device"; 4,274,589 by Jones, entitled "Spraying apparatus employing a skirt structure"; 4,986,473 by Semple et al, entitled "Crop sprayer shield"; 5,139,200 by Greimann et al, entitled "Shield for agricultural sprayer"; 7,063,273 by Hahn et al, entitled "Spray delivery system"; and 8,573,510 by Bisson et al, entitled "Drift shroud system for spray booms of turf sprayer". Unfortunately, these prior art shields are quite large and designed to operate close to the ground, and so are susceptible to damaging interference with rocks, roots, mounds, and other obstacles in the ground. As with the Elsworth or Claussen et al shields, these shields are fixed in geometry. This means that even in the middle of the field, the farthest transverse edges (the left and right extremes) of the shields will undesirably block spray from reaching plants, and will instead drip the spray onto the earth. Any fixed shields that do not block the spray on the transverse edges will likewise not prevent the undesirable overspray discussed herein above.

Additional patents of varying relevance, the relevant teachings and contents which are incorporated herein by reference, include: 3,565,341 by Burroughs, entitled "Spraying apparatus"; 4,124,221 by Goings, entitled "Spray guard for vehicles"; 4,927,080 by Alsing, entitled "Field spraying device"; 5,062,572 by Reiter et al, entitled "Spray shield"; 5,549,457 by Flores et al, entitled "Pavement sprayer having movable spray guard"; 8,066,304 by Ulgen, entitled "Retractable mud flap for vehicles"; and Des 702,124 by Harrower et al, entitled "Rotatable spray shield device".

In addition to the foregoing patents, Webster's New Universal Unabridged Dictionary, Second Edition copyright 1983, is incorporated herein by reference in entirety for the definitions of words and terms used herein.

As may be apparent, in spite of the enormous advancements in agriculture and substantial research and development that has been conducted, there still remains a need for a spray shield that will permit efficient spraying in the middle of a field while also selectively blocking overspray at the field edges.

SUMMARY OF THE INVENTION

In a first manifestation, the invention is a selectively deployable spray shield for agricultural use. A spray barrier has a first concealed spray barrier position in which the spray barrier is inoperative, and a second deployed spray barrier position configured to block at least a portion of a spray emanating from an agricultural sprayer. A clam-shell storage tube has a bottom, side walls, a cover, and a pintle between the cover and bottom that allows the cover to open in a clam-shell manner. The clam-shell storage tube defines a path for the hinge plate to reciprocate along, and is configured to receive and conceal the spray shield on an interior when the clam-shell storage tube is closed. A deployment and concealment drive has a motor moving the clam-shell storage tube between the first concealed position having the spray barrier concealed within the clam-shell storage tube to the second deployed spray barrier position having the spray barrier deployed outside the clam-shell storage tube.

In a second manifestation, the invention is, in combination, an agricultural spray machine, an agricultural spray boom, and a retractable spray shield for agricultural use. The agricultural spray machine has a drive train; a liquid tank; and a pump receiving a liquid held within the liquid tank. The agricultural spray boom has a boom arm extending transverse to a forward direction of travel of the agricultural spray machine; and at least one spray nozzle suspended from the boom arm and in fluid communication with the pump. The retractable spray shield for agricultural use has a hinge plate; a liquid barrier film extending from the hinge plate; a clam-shell storage tube defining a path for the hinge plate to reciprocate along, and adapted to receive and conceal the spray shield on an interior when the clam-shell storage tube is closed; a deployment and concealment drive having a motor, a drive shaft, and a quadrilateral linkage including a rotating arm and a pushing arm coupled with the drive shaft, the drive shaft rotating the pushing arm relative to the clam-shell storage tube and thereby also rotating the rotating arm relative to the clam-shell storage tube between a first concealed position having the rotating and pushing arms parallel and adjacent to the clam-shell storage tube to a second deployed position having the pushing arm parallel and adjacent to the clam-shell storage tube; and a boom arm coupler adapted to couple the retractable spray shield to the agricultural spray boom and simultaneously locate the liquid barrier film in the second deployed position adjacent to and in a spray pattern of the at least one spray nozzle.

OBJECTS OF THE INVENTION

Exemplary embodiments of the present invention solve inadequacies of the prior art by providing a retractable spray shield for agricultural use. The retractable spray shield has a liquid barrier film; a storage tube; a deployment and concealment drive that in one direction deploys the liquid barrier film from the storage tube and in a second direction opposed to the first direction conceals the liquid barrier film within the storage tube; and a pivotal quick release support and boom arm coupling.

The present invention and the preferred and alternative embodiments have been developed with a number of objectives in mind. While not all of these objectives are found in every embodiment, these objectives nevertheless provide a sense of the general intent and the many possible benefits that are available from embodiments of the present invention.

A first object of the invention is to provide an apparatus that may be deployed to reduce or eliminate overspray adjacent to the edges of a field, and which may be concealed so as to not interfere with spray within the middle of the field. A second object of the invention is to enable the apparatus to be deployed or concealed from within the cab of a spray vehicle, without necessitating the operator to disembark from the cab. Another object of the present invention is to facilitate the spraying of a variety of fields, without the need for mechanical adjustment to a particular species, or plant height and maturity. A further object of the invention is to provide apparatus that is effective with a spray emanating generally at an angle closer to parallel to the ground than perpendicular thereto. Yet another object of the present invention is to achieve the foregoing objectives with an apparatus that is easily fabricated and which may be easily installed upon both new and existing spray boom arms.

BRIEF DESCRIPTION OF THE DRAWINGS

The foregoing and other objects, advantages, and novel features of the present invention can be understood and appreciated by reference to the following detailed description of the invention, taken in conjunction with the accompanying drawings, in which:

FIG. 4 illustrates the preferred embodiment retractable spray shield in the concealed configuration of FIG. 1 but without the prior art agricultural spray boom, from a side elevational view.

FIG. 5 illustrates the preferred embodiment retractable spray shield in the concealed configuration of FIG. 4, from a front elevational view and indicating the movement of the shield during deployment.

FIG. 6 illustrates the preferred embodiment retractable spray shield in the deployed configuration of FIG. 3 but without the prior art agricultural spray boom, from a side elevational view.

FIG. 7 illustrates the preferred embodiment retractable spray shield in the deployed configuration of FIG. 3 in combination with and affixed to a prior art agricultural spray boom in operation spraying a crop, from a front elevational view and indicating the movement of the shield during concealment.

FIG. 15 illustrates the third alternative embodiment retractable spray shield for agricultural use of FIGS. 13-14 at an intermediate position between deployed and retracted position from a sectioned top view.

FIG. 16 illustrates the third alternative embodiment retractable spray shield for agricultural use of FIGS. 13-14 in a retracted position from a sectioned top view.

FIGS. 17-21 sequentially illustrate from a partial and sectioned front elevational view the third alternative embodiment retractable spray shield for agricultural use of FIGS. 13-14, retracting the spray shield from a fully deployed position in FIG. 17 to a fully retracted position in FIG. 21.

FIG. 22 illustrates the fourth alternative embodiment retractable spray shield for agricultural use designed in accord with the teachings of the present invention in a deployed configuration from a top plan view.

FIG. 23 illustrates the fourth alternative embodiment retractable spray shield for agricultural use of FIG. 22 in a retracted configuration from a top plan view.

DESCRIPTION OF THE PREFERRED EMBODIMENT

Figure 1:
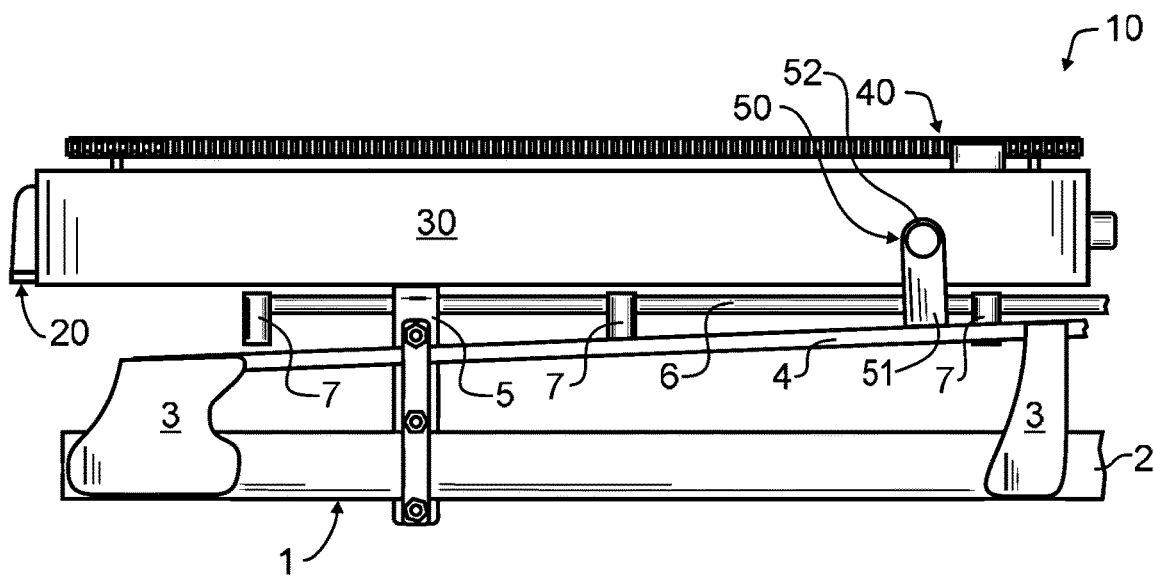
FIG. 1 illustrates a preferred embodiment retractable spray shield for agricultural use designed in accord with the teachings of the present invention in a concealed configuration and in combination with and affixed to a prior art agricultural spray boom, from a front elevational view.

Manifested in the preferred embodiment, the present invention provides a retractable spray shield assembly 10 designed for agricultural use in combination with a prior art agricultural spray boom 1. Preferred embodiment retractable spray shield assembly 10 comprises a spray shield 20, storage tube 30, deployment and concealment drive 40, and pivotal quick release support and boom arm coupling 50.

Figure 2:
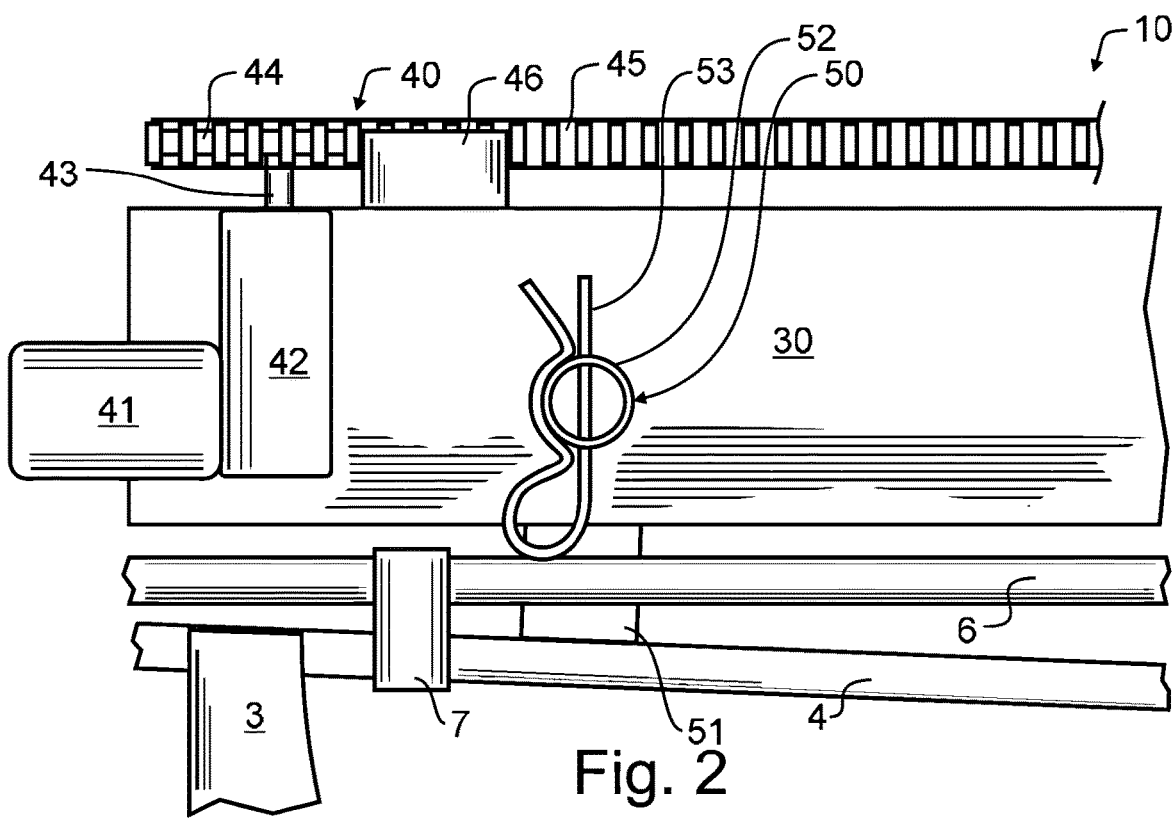
FIG. 2 illustrates the preferred embodiment retractable spray shield of FIG. 1 from an enlarged and partial rear elevational view.
Figure 3:
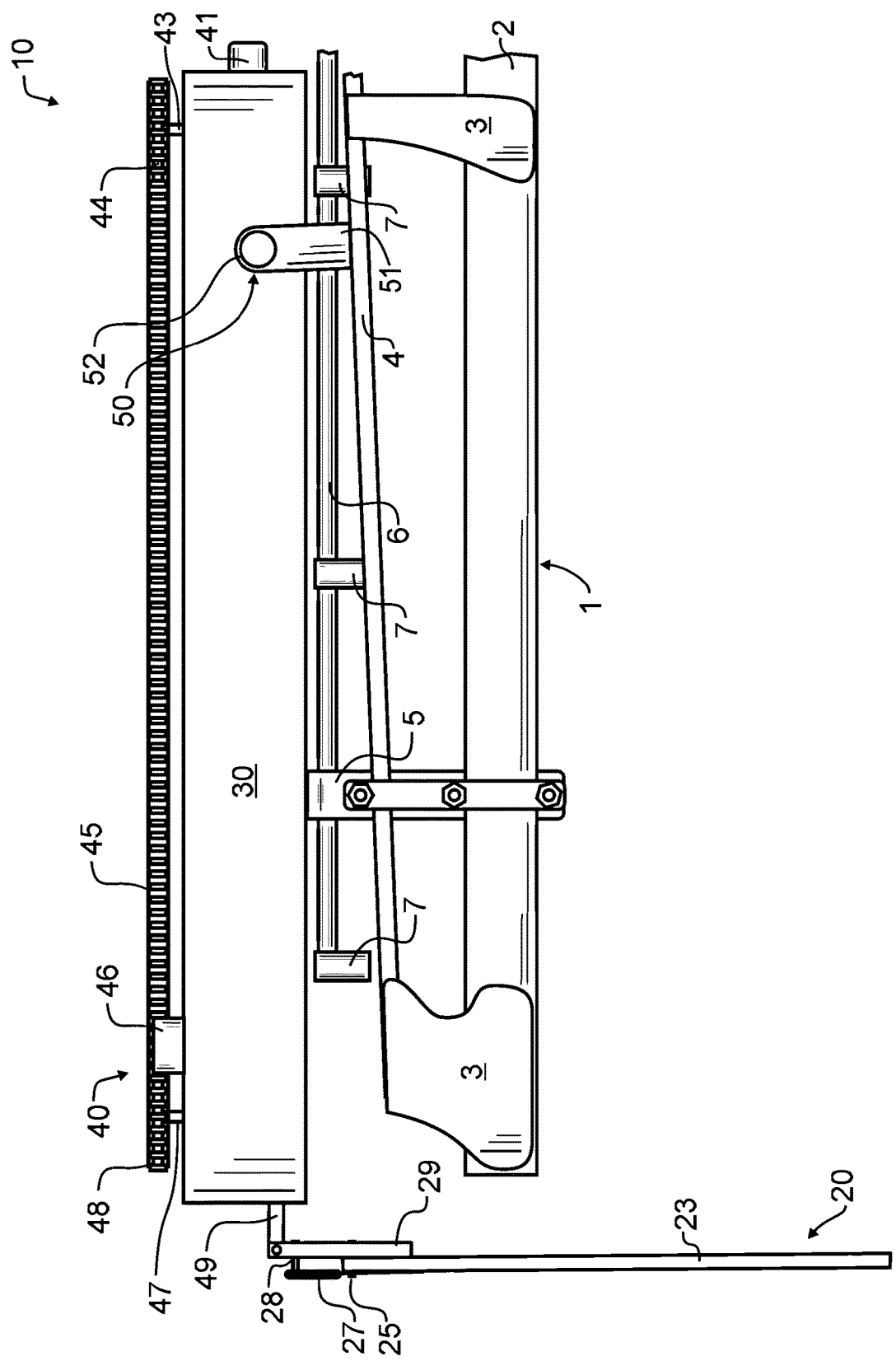
FIG. 3 illustrates the preferred embodiment retractable spray shield of FIG. 1 in a deployed configuration and in combination with and affixed to the agricultural spray boom, from a front elevational view.
Figure 8:
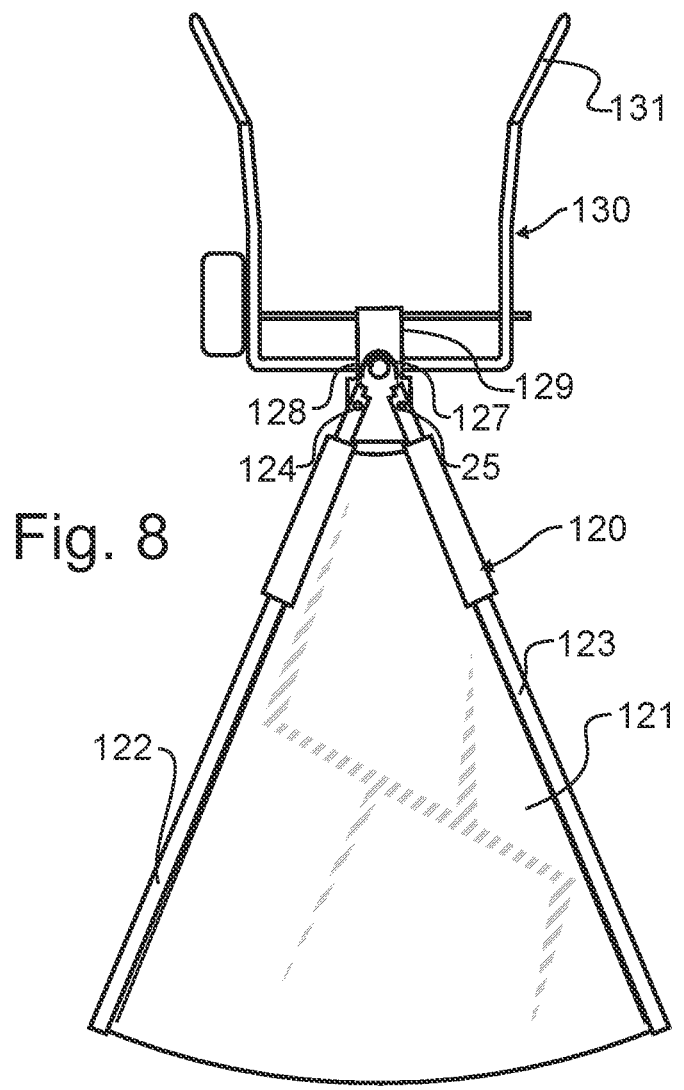
FIGS. 8-10 illustrate a first alternative embodiment retractable spray shield for agricultural use designed in accord with the teachings of the present invention in a deployed configuration from a side elevational view, front elevational view with the shield in a first partially retracted position, and a front elevational view with the shield in a second partially retracted position, respectively.
Figure 9:
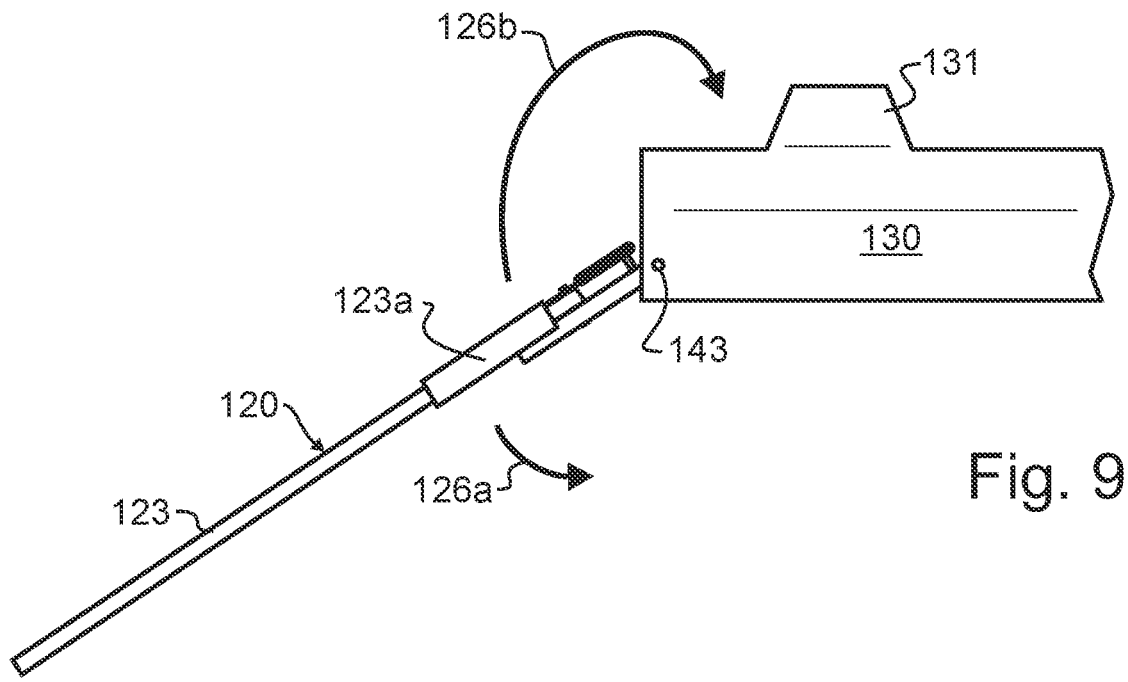
Figure 10:
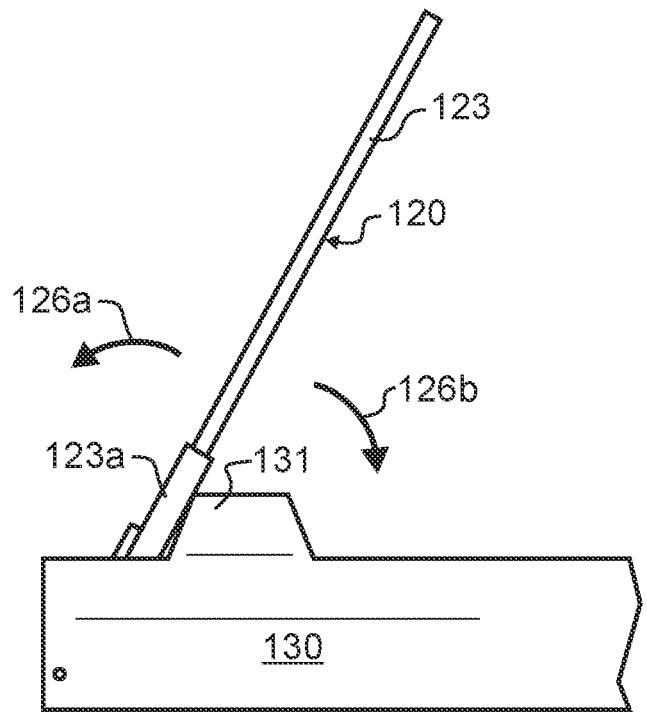

As illustrated in FIGS. 1-3, prior art agricultural spray boom 1 may for exemplary purposes include a beam or truss comprising a bottom chord 2, a top chord 4, and a plurality of web members 3 coupling the bottom chord 2 and top chord 4 together. One or more "L"-shaped hangers 5 couple to the bottom and top chords 2, 4, and provide a support distal thereto for a liquid carrying pipe 6. Pipe 6 will be coupled at a first end to a pump as is known in the art, and has a plurality of spray nozzles 7 through which the liquid within pipe 6 may be dispersed over a field. While three spray nozzles 7 are illustrated in FIG. 1, it will be understood that any number of nozzles may be provided, and that these nozzles may be pointed in a plurality of directions.

Spray shield 20 is best illustrated in FIGS. 3-7. A relatively large and generally flaccid generally triangular-shaped liquid barrier film 21 serves to block the passage of any significant amount of liquid there through. While a liquid impervious and hydrophobic material such as plastic sheet manufactured from polyethylene terephthalate, polyethylene, or the like may be preferred for some applications, fabric incorporating any of a variety of materials will also be acceptable for some applications. One such fabric is known commercially as rip-stop nylon. Regardless of the material, liquid barrier film 21 must be sufficiently durable to withstand the force of the spray emanating from spray nozzles 7, to also withstand repeated collapsing as illustrated in FIG. 4, to withstand repeated fanning as illustrated in FIG. 6, and provide sufficient chemical resistance to withstand exposure to the variety of liquids that may be sprayed by prior art agricultural spray boom 1. Liquid barrier film 21 will also preferably have adequate ultra-violet resistance to withstand significant outdoor exposure.

A pair of framing legs 22, 23 are used to alternatively collapse and stretch liquid barrier film 21. These framing legs 22, 23 are pivotally affixed to hinge plate 29 through pintles 24, 25. Pintles 24, 25 may be any suitable pivot or hinge that permits framing legs 22, 23 to pivot with respect to hinge plate 29, and so for exemplary and non-limiting purpose may comprise shoulder bolts in combination with locking nuts passing through holes or bushing sleeves within framing legs 22, 23. A relatively larger diameter spring guide post 28 is provided about which tension spring 27 wraps. Tension spring 27 spans between framing legs 22, 23 and is aligned so that any pivoting of framing legs 22, 23 away from the position illustrated in FIG. 6 will stretch spring 27.

This will increase the tension in spring 27, meaning spring 27 will resist such movement. As a result, under ordinary operating conditions where spray shield 20 is deployed, such as illustrated in FIGS. 6 and 7, tension spring 27 will hold liquid barrier film 21 in the expanded position best visible in FIG. 6. However, in the event of an unintentional impact with the earth or other object, framing legs 22, 23 are able to pivot, reducing the chance of permanent harm or damage. Tension spring 27 is illustrated as being helically wrapped, but any suitable tension spring that may span between framing legs 22, 23 while passing over spring guide post 28 may be substituted therefor.

Storage tube 30 serves as a receptacle within which spray shield 20 may be received for storage in an inactive state, and from which spray shield 20 may be deployed. While illustrated as a square tube, it will be appreciated that storage tube 30 may take other suitable geometry. Further, storage tube 30 is not required to be fully enclosed, and so may alternatively be open on the top and form a three-sided channel.

Mounted on top of storage tube 30 is deployment and concealment drive 40. Drive 40 includes a motor 41, ninety-degree gear box 42, drive shaft 43, sprocket 44, chain 45, chain follower 46, idler shaft 47, sprocket 48, and pivotal link 49. While a chain drive is illustrated, it will be apparent that other suitable drives may alternatively be used herein, such as but not limited to a belt drive, a hydraulic drive, or a helical shaft such as an acme screw and a threaded follower.

Motor 41 is most preferably a 12 VDC motor compatible with most farm machinery, allowing the motor to be powered directly from the sprayer electrical system without the need for conversion of electricity. While not illustrated, a double pole triple throw or double pole double throw center off switch will preferably be provided within the cab of the sprayer that permits the operator to disconnect power to the motor, or to energize the motor in either a forward or reverse direction.

Ninety-degree gear box 42 is optional, but provides compact and durable gear reduction, allowing motor 41 to be a relatively less expensive and more standard DC motor, and also increasing the output torque while reducing rotational speed. Nevertheless, motor 41 may directly drive the drive shaft 43, or may be coupled through a parallel axis gear reducer rather than the ninety-degree gear box 42. Sprocket 44 terminates drive shaft 43, and the teeth of sprocket 44 are configured to engage with and drive chain 45. Affixed securely to chain 45 is chain follower 46. Consequently, when drive chain 45 turns, chain follower 46 will move linearly along storage tube 30. While not essential to the present invention, chain follower 46 may run in a track at the bottom of or anywhere else within storage tube 30 distal to drive chain 45, if so desired for better stability. In preferred embodiment retractable spray shield assembly 10, a pair of guide blocks 31 visible in FIG. 6 may sandwich and thereby prevent chain follower 46 from drifting within storage tube 30, and may also provide a linear bearing surface in contact with the wall of storage tube 30.

Adjacent the end of storage tube 30 distal to drive shaft 43 and sprocket 44 is idler shaft 47 that terminates with sprocket 48. As the name implies, idler shaft 47 will terminate in a journal distal to sprocket 48 to permit free rotation about the longitudinal axis. Consequently, idler shaft 47 and sprocket 48 simply maintain direction and tension within chain 45.

The construction of deployment and concealment drive 40 is similar to a garage door opener, including the provision of chain follower 46. Also like a garage door opener, some type of travel limit must be provided. The travel limit may be in the form of mechanical stops at each distal end of the travel of chain follower 46 that trigger a detectable force or torque that is used to shut off power to motor 41. However, electrical switches or position detectors adjacent each distal end of travel may be provided in alternative embodiments for the same purpose, or other suitable equivalent control may be provided.

While a chain drive is preferred for deployment and concealment drive 40, in alternative embodiments other types of drives may be incorporated, including but not limited to a belt drive, a screw drive defined by a helically threaded shaft such as an acme screw coupled with a female threaded follower, or a linear electric, hydraulic, or pneumatic cylinder drive. The particular form of motive power will be determined by a designer. Nevertheless, and as noted herein above, the use of an electric drive in combination with chain 45 provides a robust drive that is familiar and readily serviced by most agricultural machinery operators, which may be controlled using the existing electrical system of most sprayers, and which can be easily connected through light weight wires of any needed length.

Pivotal link 49 is coupled adjacent the end of chain follower 46 distal to chain 45. Pivotal link 49 allows the top of hinge plate 29 to climb above the bottom of storage tube 30 before rotating into longitudinal alignment parallel to the longitudinal axis of storage tube 30. Such motion necessarily occurs during retraction of spray shield 20, in the direction of travel illustrated by arrow 26b in FIG. 7. When chain follower 46 moves to the right in that Figure, pivotal link 49 will also move to the right. When hinge plate 29 contacts the entrance to storage tube 30, it will tilt to an angle intermediate between vertical and horizontal, and at that moment the junction between pivotal link 49 and hinge plate 29 will be elevated relative to the bottom of storage tube 30.

Pivotal quick release support and boom arm coupling 50 is designed for ready installation on a variety of prior art boom arms, whether such prior art boom arms resemble prior art agricultural spray boom 1 illustrated herein or not. Boom arm coupling bracket 51 is designed on a first end to be either clamped, welded, or otherwise affixed to top chord 4, while the distal end of the bracket is affixed to a pipe 52 extending transverse to top chord 4. Pipe 52, visible best in FIG. 2, preferably has a hole drilled through which a retainer such as a cotter pin 53 may pass. Pivotal quick release support and boom arm coupling 50 provides a first support. In preferred embodiment retractable spray shield assembly 10, one or more "L"-shaped hangers 5 provide a second support surface upon which storage tube 30 will rest. In one alternative embodiment, storage tube 30 may be clamped or otherwise affixed to "L"-shaped hangers 5. In another alternative embodiment, storage tube 30 may be coupled through a second pivotal quick release support and boom arm coupling 50.

When desired, the entire assembly of preferred embodiment retractable spray shield assembly other than pivotal quick release support and boom arm coupling 50 may be removed from prior art agricultural spray boom 1 simply by pulling cotter pin 53 from pipe 52, and then sliding storage tube 30 off of pipe 52. With the provision of appropriate electrical connectors, and the disconnection thereof, this is all that is required to remove preferred embodiment retractable spray shield assembly 10 from prior art agricultural spray boom 1.

The sequence of deployment and retraction of spray shield 20, and the functional operation thereof, is best illustrated in FIGS. 4-7. FIGS. 4 and 5 illustrate spray shield 20 in a fully retracted position, generally concealed within storage tube 30. Framing legs 22, 23 will spread from each other at the end adjacent to spring guide post 28, while coming together at the distal end as they are drawn into the interior of storage tube 30. This allows framing legs 22, 23 to move into nearly parallel orientation, appropriate for a storage position, while only nominally interfering with the side walls of storage tube 20. As noted herein above, this concealment is preferred, but in alternative embodiments for exemplary and non-limiting purpose, when storage tube 30 is a three-sided channel as described above, spray shield 20 may simply be retracted to an inactive position, while remaining visible. As also noted herein above, this pivoting of framing legs 22, 23 into nearly parallel orientation results in an increase of tension within tension spring 27, meaning tension spring 27 will be tending to oppose this retracted parallel position.

The arrow 26a of FIG. 5 illustrates the direction of travel of spray shield 20 during deployment. This movement is generated by chain follower 46 being moved by chain 45 in a direction generally away from drive shaft 43 and sprocket 44. As spray shield 20 exits storage tube 30, it will eventually start to drop distal to the open end of storage tube 30. This drop will continue until hinge plate 29 fully exits storage tube 30 and hangs down from adjacent the bottom of storage tube 30. This is the deployed position illustrated in FIGS. 6 and 7. In this position, tension spring 27 will pull the majority of framing legs 22, 23 apart, smoothing out liquid barrier film 21 into the deployed position of FIGS. 6 and 7. As may be recognized from FIG. 6, in this position liquid barrier film 21 is approximately triangular, with the narrow top point of the triangle immediately adjacent to storage tube 30. This narrow top point is therefore also immediately adjacent to top chord 4 and is very near to the most laterally displaced, or outermost, spray nozzle 7. In this location, the spray 8 emitted by a spray nozzle 7 has not had distance to fan out therefrom, meaning a narrow point is adequate to capture the bulk of spray 8 that would otherwise comprise overspray. Liquid barrier film 21 gets wider in the direction of travel of the spray vehicle as the distance increases downward and therefore away from spray nozzles 7. Since there will be increased dispersion of spray 8 with increased distance, this wider base to liquid barrier film 21 corresponds therewith.

In the deployed position of FIG. 7, spray shield 20 will not interfere with spray 8 emanating from nozzle 7 that is directed generally downward therefrom toward crop plants 9. However, spray emanating in a more horizontal direction generally parallel to the longitudinal axis of prior art agricultural spray boom 1, such as spray streams 8*a* and 8*b*, will contact liquid barrier film 21 or the pair of framing legs 22, 23, meaning spray nozzles 7 will effectively be blocked from over spraying in that direction.

When a pass along the edge of a field is complete, and the subsequent passes will be within the field rather than along an edge, then the operator will control the switch such that motor 41 will be driven to move chain follower 46 away from idler shaft 47 toward drive shaft 43. This retracts spray shield 20 in the direction of travel illustrated by arrow 26*b* in FIG. 7, allowing the spray nozzles 7 to again overspray adequately to ensure complete coverage within the middle of the field.

As may be apparent then, the operator simply switches the switch from within the spray vehicle cab to deploy preferred embodiment retractable spray shield assembly 10 from the position of FIGS. 4 and 5 to the position of FIGS. 6 and 7, immediately in advance of prior art agricultural spray boom 1 passing adjacent to the field edge. When the field edge has been traversed, the operator again simply switches the switch from within the spray vehicle cab to retract spray shield 20.

A wide variety of materials may be used in the fabrication of preferred embodiment retractable spray shield assembly 10, including spray shield 20, storage tube 30, deployment and concealment drive 40, and pivotal quick release support and boom arm coupling 50. These materials may include metals, polymers and resins, elastomers, glass and ceramic compositions, and laminates, composites, or combinations thereof. However, the materials should be selected to withstand the forces that will be encountered during use, the extremes and vagaries of temperature, weather, and sunlight, and the wear and tear that will be incurred during use.

Various embodiments of apparatus designed in accord with the present invention have been illustrated in the various figures. The embodiments are distinguished by the hundreds digit, and various components within each embodiment designated by the ones and tens digits. However, many of the components are alike or similar between embodiments, so numbering of the ones and tens digits have been maintained wherever possible, such that identical, like or similar functions may more readily be identified between the embodiments. If not otherwise expressed, those skilled in the art will readily recognize the similarities and understand that in many cases like numbered ones and tens digit components may be substituted from one embodiment to another in accord with the present teachings, except where such substitution would otherwise destroy operation of the embodiment. Consequently, those skilled in the art will readily determine the function and operation of many of the components illustrated herein without unnecessary additional description.

In preferred embodiment retractable spray shield assembly 10, spray shield 20 is retracted into and deployed from deployment and concealment drive 40, which may be configured to fully encompass spray shield 20. This design is particularly resistant to the wind. However, spray shield 20 will normally not be used in high wind applications.

In consideration thereof, a first alternative embodiment retractable spray shield assembly 110 is illustrated in FIGS. 8-10 that retracts and deploys in a different manner. Spray shield 120 incorporates a liquid barrier film 121, a pair of framing legs 122, 123, pintles 124, 125, a tension spring 127, and a spring guide post 128, all which operate in a manner very similar to that of preferred embodiment retractable spray shield assembly 10. However, instead of a motor and gearbox operating a linear chain drive, in first alternative embodiment retractable spray shield assembly 110 a motor and ninety degree gear box 141 directly drive hinge plate 129 in a rotary manner, pivoting hinge plate 129 and spray shield 120 about a drive shaft 143 axis perpendicular to the boom arm and approximately parallel to the earth. Arrow 126*b* of FIGS. 9-10 illustrates the direction of travel of spray shield 120 during retraction.

Rather than retracting into a generally enclosed tube, storage tube 130 is a three-sided channel that is open on top. As spray shield 120 rotates from the deployed position illustrated, framing legs 122, 123 will contact a pair of guide blocks 131. Guide blocks 131 will progressively collapse framing legs 122, 123 together, eventually guiding the entirety of spray shield 120 into storage tube 130. While a slightly different embodiment, FIG. 12 illustrates how spray shields 120, 220 are located in the retracted position, running longitudinally parallel to storage tubes 130, 230, respectively.

In first alternative embodiment retractable spray shield assembly 110, guide blocks 131 are simply formed smooth surface extensions of storage tube 130. Guide blocks 131 will preferably introduce only minimal friction with framing legs 122, 123. Unfortunately, the design objectives are somewhat contradictory for framing legs 122, 123. As may be appreciated, these framing legs 122, 123 will most preferably be light weight and still rigid and strong, so that liquid barrier film 121 is fully deployed by the spreading of these legs. However, materials that are light and strong tend not to be particularly durable. Furthermore, they might not comprise a low or anti-friction composition. As a result, framing legs 122, 123 may be difficult to fully retract, and the repeated sliding in contact with guide blocks 131 may over time erode the material, leading to premature failure.

To avoid these drawbacks, framing legs 122, 123 may be augmented with either circumferential sleeves or heavier, low-friction material as identified by augmented portions 122a, 123a. Most preferably, it is these augmented portions 122a, 123a that will engage with guide blocks 131 during retraction of spray shield 120.

In alternative embodiments, more elaborate guide blocks may be provided. For exemplary and non-limiting purpose, in one alternative embodiment guide blocks 131 may further comprise roller bearings running longitudinally generally parallel with guide blocks 131. In such case, when framing legs 122, 123 come into contact therewith, the roller bearings will roll, reducing the friction required to be overcome to fully retract spray shield 120. In another alternative embodiment guide blocks 131 may further comprise a low-friction surface layer or coating. Again for exemplary and non-limiting purposes, one such material is polytetrafluoroethylene, commercially sold under the trademark Teflon™.

In further alternative embodiments, other methods of reducing the forces required to fully retract spray shield 120 are used. In one alternative embodiment, eccentric cams may be substituted for or mounted onto guide blocks 131, such as in a manner similar to roller bearings. These eccentric cams are configured to roll with the movement of spray shield 120, and during the roll progressively drive framing legs 122, 123 together.

In another alternative embodiment, either eccentric cams or a cable pull may be provided that release tension spring 127 from spring guide post 128. In such case, the cable pull must re-establish tension or the eccentric cams must reset in position during deployment of spray shield 120 to ensure that tension spring 127 is functionally engaged with spring guide post 128 prior to full deployment. In a further embodiment, an electrical solenoid may be provided to either shift spring guide post 128 to relieve tension in tension spring 127, or to shift tension spring 127 away from spring guide post 128 during retraction. In yet another alternative embodiment, a gear set and electrical drive motor may be provided to accomplish similar function.

As illustrated, each of the tension springs 27, 127 are a single, self-centering spring.

Nevertheless, there is no requirement of the same, and in other alternative embodiments two separate and distinct springs may be substituted therefore. In such case, relieving tension may simply be a matter of extending a spacer between the attachment points for the two springs. In other words, the two springs can simply be spread apart, effectively lengthening them, using any of the aforementioned apparatus to spread the spring attachment points, thereby reduce the tension, and allow for lower force retraction of spray shield 120.

Figure 11:
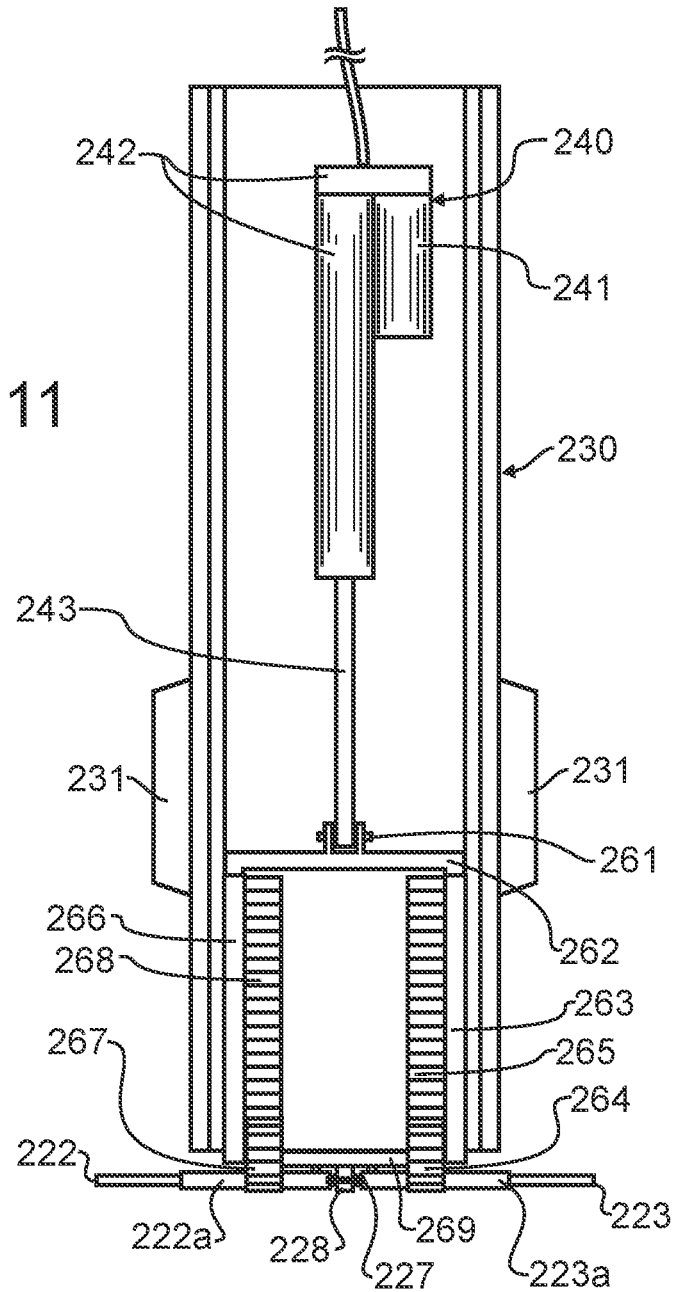
FIGS. 11-12 illustrate a second alternative embodiment retractable spray shield for agricultural use designed in accord with the teachings of the present invention in a deployed configuration from a top plan view and in a substantially retracted configuration from a top plan view, respectively.
Figure 12:
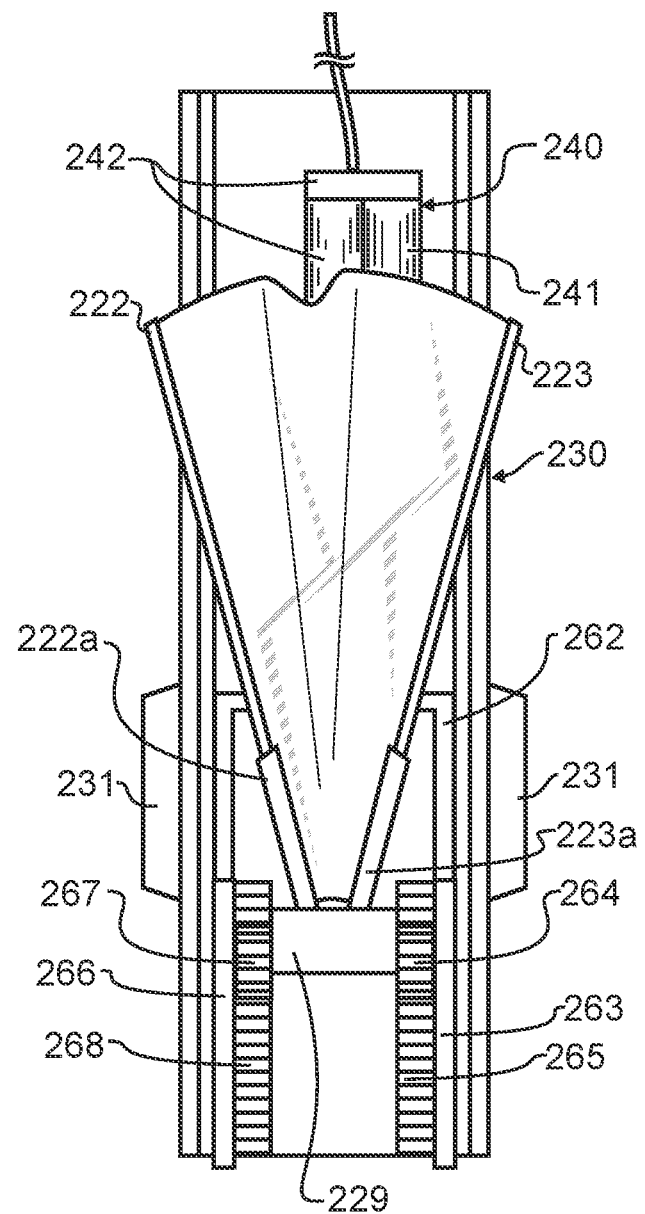

FIGS. 11 and 12 illustrate second alternative embodiment retractable spray shield assembly 210 in a retracted position. Retractable spray shield assembly 210 is, as noted above, similar to first alternative embodiment retractable spray shield assembly 110. However, retractable spray shield assembly 210 incorporates an electrically driven gear motor linear actuator 240 of the known type having a motor 241, a gear box 242, and a linear drive shaft 243. Linear actuator 240 is preferably supported by the bottom of storage tube 230, with linear drive shaft 243 extending longitudinally parallel to a longitudinal axis of storage tube 230. At the end of drive shaft 243 distal to gear box 242, a pivotal coupling 261 is provided, which may for exemplary and non-limiting purpose comprise a U-shaped bracket pinned to the end of drive shaft 243. Any suitable pivotal coupling may be substituted therefore.

Pivotal coupling 261 is rigidly affixed with U-shaped bar 262. Each of the legs of U-shaped bar 262 pass through a cover or guide blocks 263, 266 and terminate at a rotatable coupling to shaft 269. Adjacent each end of shaft 269 are pinion gears 264, 267 that are fixed and not rotatable with respect to shaft 269. Also fixed and not rotatable with respect to shaft 269 is hinge plate 229.

FIG. 11 illustrates spray shield 220 in a fully deployed configuration, while FIG. 12 illustrates spray shield 220 in a retracted position. As drive shaft 243 retracts from the position of FIG. 11 into gear box 242, through pivotal coupling 261 it will also pull U-shaped bar 262 toward gear box 242. This then directly pulls on shaft 269, which will rotate within journals such as sleeves or bearings in the ends of the legs of U-shaped bar 262. Since the teeth of pinion gear 264 are directly engaged in the teeth of rack 265, and since the teeth of pinion gear 267 are directly engaged in the teeth of rack 268, movement of shaft 269 toward gear box 242 will cause shaft 269 to rotate. Since hinge plate 229 is also affixed to shaft 269, this rotation will also cause spray shield 220 to rotate. Eventually, spray shield 220 will fully retract to the position illustrated in FIG. 12. Reversal of linear actuator 240 will likewise redeploy spray shield 220 to the position illustrated in FIG. 11.

As may be appreciated, while a number of deployment and concealment drives 40, 140, 240 and alternatives thereto have been described, any deployment and concealment drive capable of rotating spray shield 220 through an approximate 270 degree arc of travel will be considered to be incorporated herein. Electrical drives are most preferred, owing to the low weight and simple installation required for electrical wire extending the length of the boom. For exemplary and non-limiting purpose, such drives may also include solenoids and other linear motors. Nevertheless, fluid motors including hydraulic, pneumatic, and other drives may be used in alternative embodiments.

FIGS. 13 through 21 illustrate a third alternative embodiment retractable spray shield assembly 310. Retractable spray shield assembly 310 is, as noted above, similar to the second alternative embodiment retractable spray shield assembly 210. Retractable spray shield assembly 310 incorporates linear actuator 340 of known type, which for exemplary and non-limiting purpose includes an electrically driven motor 341, a gear box 342, and linear drive shaft 343. However, in third alternative embodiment retractable spray shield assembly 310, linear drive shaft 343 drives pushing arm 375 of a quadrilateral linkage 370 forward or backward around pivot 371. Quadrilateral linkage 370 is comprised of four sides made up of pushing arm 375, pivot arm 376, the distance between lower pivots 371 and 372 which are held in position by storage tube bottom 331, and the distance between the upper pivots 373 and 374 which are affixed to spray shield transport plate 329. Linear actuator 340 is preferably pivotally supported by the bottom of storage tube 331, with linear drive shaft 343 extending generally longitudinally parallel to the longitudinal axis of storage tube 330. At the end of drive shaft 343 distal to gear box 342, a pivotal coupling 344 is provided, which may for exemplary and non-limiting purpose comprise a U-shaped bracket affixed to the end of drive shaft 343. Any suitable pivotal coupling may be substituted therefore.

Figure 13:
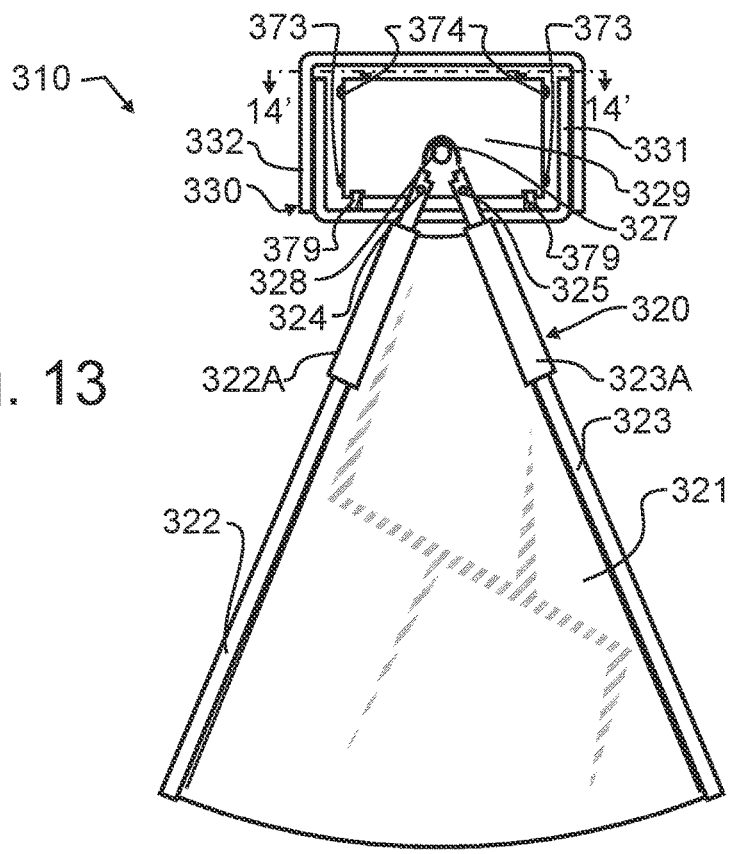
FIGS. 13-14 illustrate a third alternative embodiment retractable spray shield for agricultural use designed in accord with the teachings of the present invention in a deployed configuration from a side elevational view and a top sectioned plan view, respectively.
Figure 14:
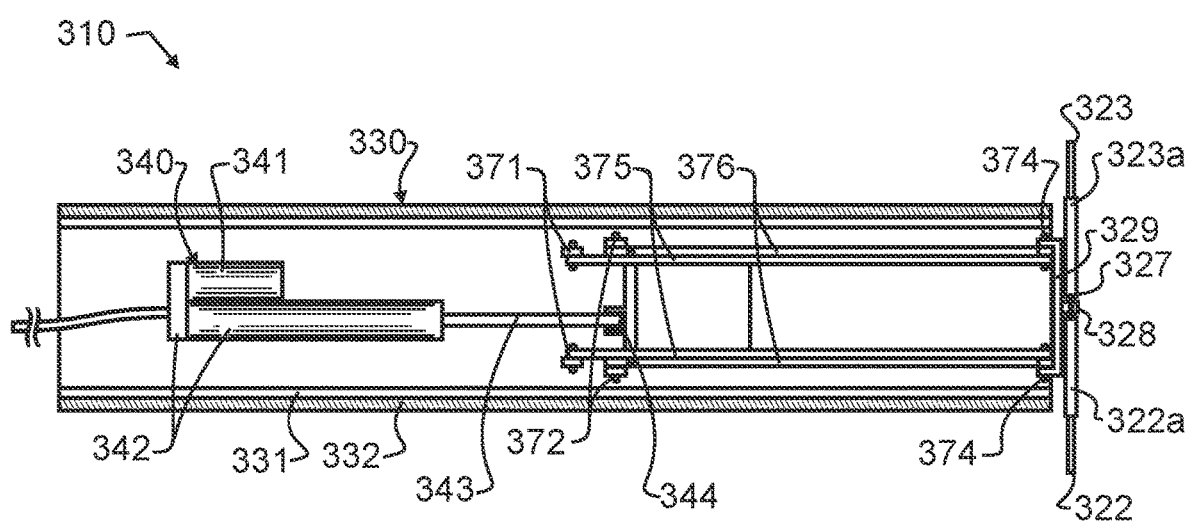

FIGS. 13 and 14 illustrate the retractable spray shield assembly 310 in its deployed position which operates similar to retractable spray shield assembly 210, where the spray shield 320 which operates in deployed state is essentially identically to spray shield 220. When spray shield 320 is deployed, tension spring 327 wraps around spring guide post 328 and pulls on framing legs 322, 323. Framing legs 322, 323 rotate about pintles 324, 325 under the force of tension spring 327, biasing framing legs 322, 323 to hold liquid barrier film 321 in an open position. Pintles 324, 325 and spring guide post 328 are affixed to spray shield support plate 329 and guide spray shield 320 as it moves through the path that quadrilateral linkage 370 defines.

When spray shield 320 is in the deployed position of FIGS. 13 and 14, spray shield storage tube top 332 remains parallel and touching storage tube bottom 331 by the force of gravity. While not separately illustrated, spray shield storage tube top 332 is pivotally affixed to storage tube bottom 331, and so is free to rotate in a clockwise and counterclockwise manner as illustrated in FIGS. 17-21, in a clam-shell manner described further herein below. However, in one alternative embodiment, a spring is provided to pull spray shield storage tube top 332 toward a parallel alignment with storage tube bottom 331. In other alternative embodiments, other assists may be provided to achieve this objective. Again for exemplary and non-limiting purpose, a linear track such as a longitudinally extensive bar or U-channel may be provided that extends longitudinally just below the top of spray shield storage tube top 332. In this alternative embodiment, pivot 374 comprises in part a pin that protrudes from the sides of spray shield transport plate 329, and this pin is configured to slide within the linear track. In such embodiment, spray shield storage tube top 332 will follow the movement of pivot 374 and spray shield transport plate 329, irrespective of wind, bumps, and the like that might otherwise lift spray shield storage tube top 332.

As best visible in FIG. 14 when spray shield 320 is in the deployed position, linear drive shaft 343 is fully extended by linear actuator 340. Linear drive shaft 343 rotates pushing arm 375 to a position nearly parallel to linear drive shaft 343 and most distal to linear actuator 340.

FIG. 15 illustrates retractable spray shield assembly 310 in a transitory position intermediate between the deployed and retracted positions. In this transitory position, linear actuator 340 is partially extended and spray shield 320 is in its expanded state with liquid barrier film 321 in the open position. FIG. 16 illustrates retractable spray shield assembly 310 in the fully retracted position with linear actuator 340 in its contracted state and liquid barrier film 321 in the closed position.

Figure 17:
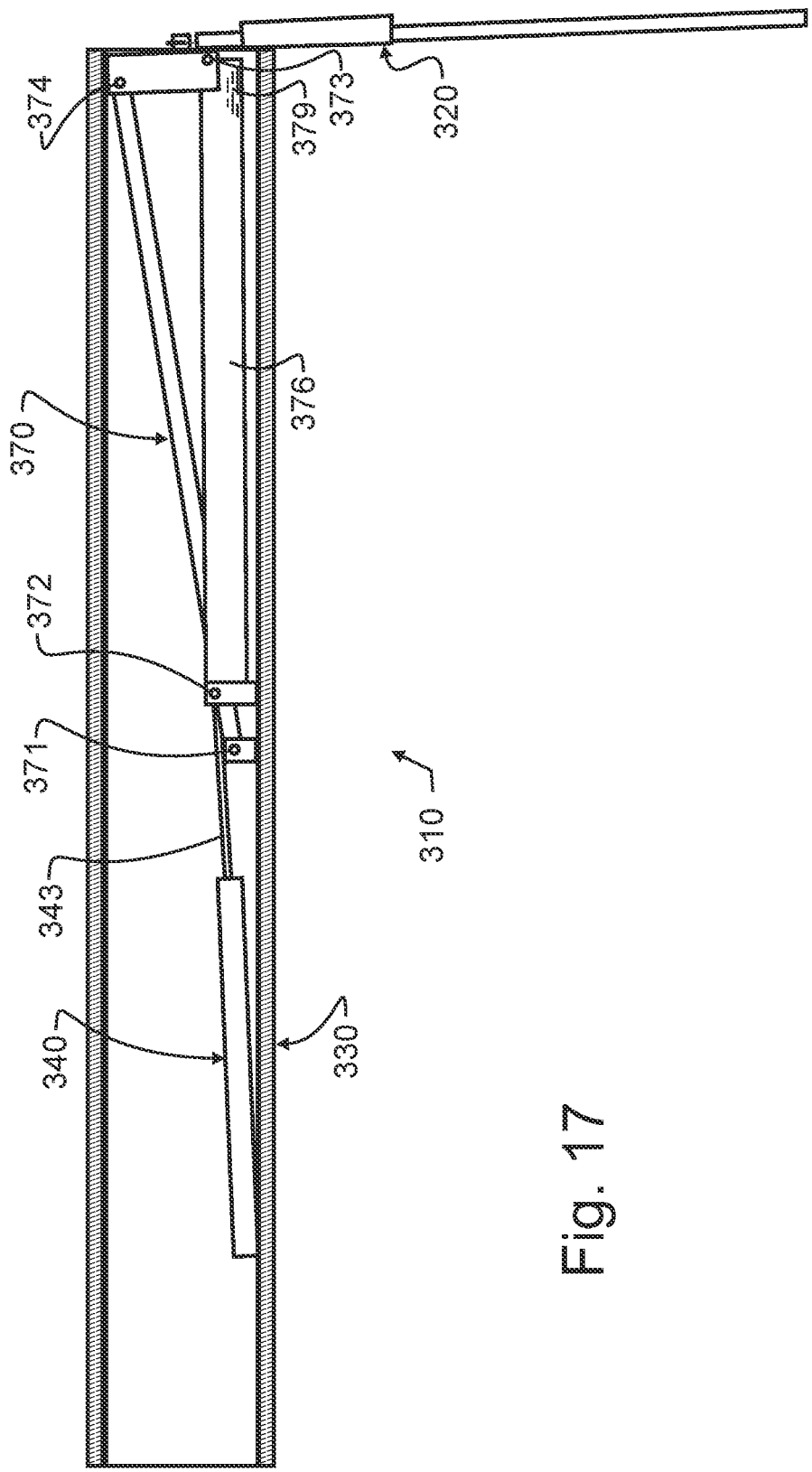
Figure 18:
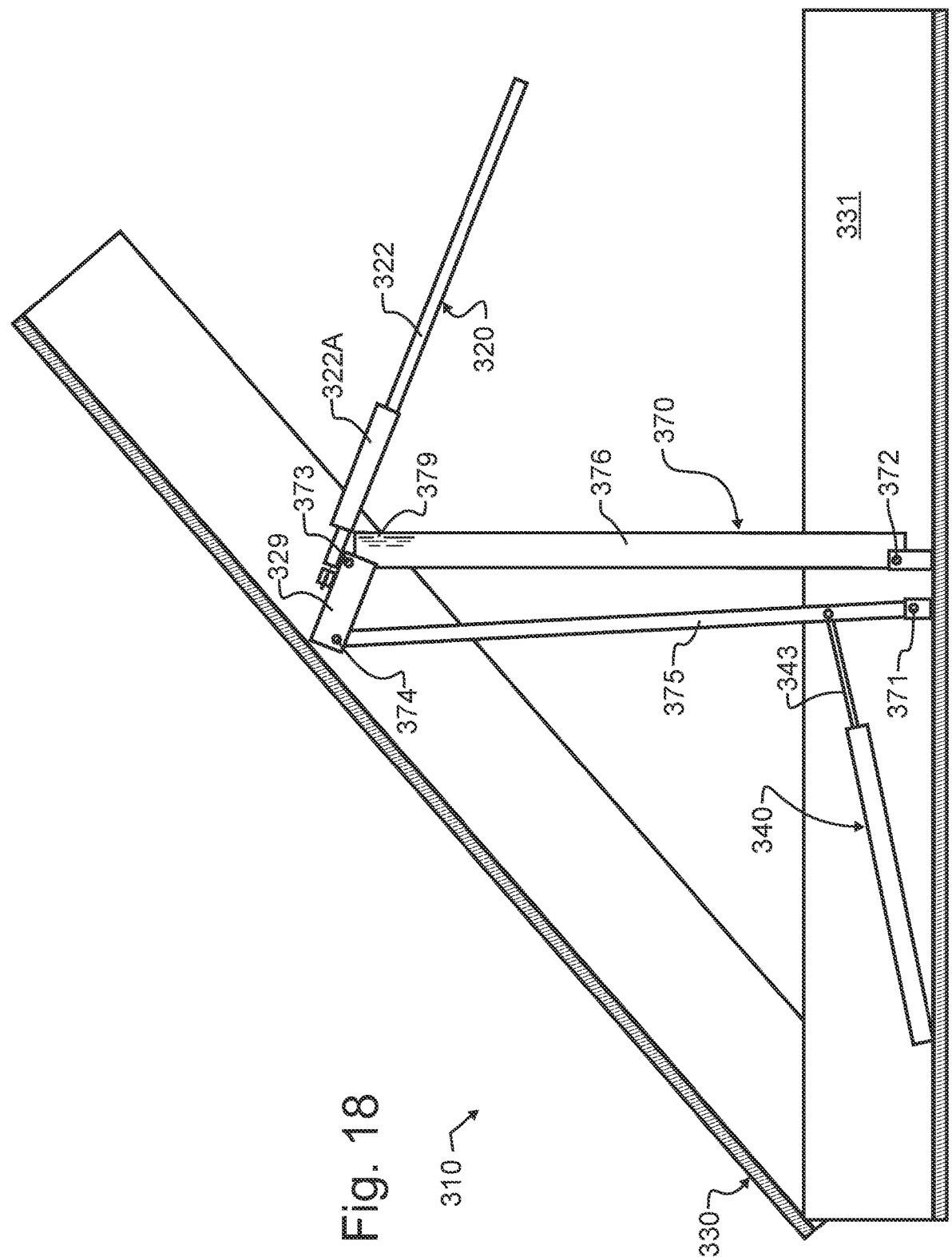

The motion of retractable spray shield assembly 310 is best shown by the sequential illustrations of FIGS. 17 through 21. In FIG. 17, retractable spray shield assembly 310 is in its fully deployed position, with spray shield 320 in its open position. Moving from the fully deployed position of FIG. 17 to a transitory position of FIG. 18, linear actuator 340 retracts and brings spray shield 320 up and more adjacent or closer to linear actuator 340 by changing the angles within quadrilateral linkage 370. Moving from FIG. 18 to FIG. 19, linear actuator 340 retracts more, and spray shield 320 starts to engage with rotating arm guides 379. In a manner similar to guide blocks 131, rotating arm guides 379 guide spray shield legs 322 and 323 inward to begin closing spray shield 320. Moving from FIG. 19 to FIG. 20, quadrilateral linkage 370 continues to rotate spray shield 320 closer to linear actuator 340, in a back and downward or counterclockwise direction in the Figures, while spray shield 320 continues to close. Moving from FIG. 20 to FIG. 21, retractable spray shield assembly 310 is moved to its fully retracted position, and spray shield 320 is completely closed. The entire process of closing retractable spray shield assembly 310 is fully reversible, by extending linear drive shaft 343 and thereby moving pushing arm 375 and the balance of quadrilateral linkage 370 from the position of FIG. 21 transitioning to the position of FIG. 17.

While in third embodiment retractable spray shield assembly 310, spray shield 320 is contracted by rotating arm guide 379, spray shield 320 may be contracted by other mechanisms. In one alternative embodiment, a rotating cam is provided that pushes on the shield legs 322 and 323 and pushes the legs closed as rotating arm 376 rotates about pivot 373. Another alternative embodiment uses a geared system to directly drive the shield legs 322 and 323 off of the rotation of rotating arm 376 about pivot 373. In further alternative embodiments, apparatus similar to that described herein above with reference to guide blocks 131 will be provided to replace or augment rotating arm guides 379.

FIGS. 22 through 28 illustrate a fourth alternative embodiment retractable spray shield assembly 410 affixed to a boom arm 1. Direction of travel is illustrated by arrow 426 in FIG. 28. Retractable spray shield assembly 410 is, as noted above, similar to the third alternative embodiment retractable spray shield assembly 310. Retractable spray shield assembly 410 incorporates a linear actuator 440 of known type including linear drive shaft 443. However, in fourth alternative embodiment retractable spray shield assembly 410, linear drive shaft 443 drives pushing pivot 474 of a quadrilateral linkage 470 forward or backward around pivot 471. Quadrilateral linkage 470 is comprised of four sides including: the linkage arm connecting pivot 474 to pivot 476; the linkage arm connecting pivot 471 to pivot 474; the distance between lower pivots 471 and 472 which are held in position by unit holder 431; and the distance between lower pivot 472 and upper pivot 476, both which are affixed to transfer arm 473. Linear actuator 440 is preferably pivotally supported by the bottom of unit holder 431, with linear drive shaft 443 reciprocally extending therefrom generally longitudinally parallel to the longitudinal axis of unit holder 431. Also, like the third alternative embodiment, retractable spray shield assembly 410 has a spray shield 420 comprising a liquid barrier film 421, framing legs such as 422 best visible in FIGS. 22 and 28, and tension springs 427 which connect to a tension plate 428 via rotating shield holder 429. Unlike the third embodiment, shield retainer 434 keeps spray shield 420 confined to unit holder 431, and helps perform the retraction duty on shield 420 that rotating arm guides 379 do for the third embodiment retractable spray shield assembly 310.

Another notable difference between the third embodiment retractable spray shield assembly 310 and fourth embodiment spray shield assembly 410 is the separation of storage tube 430 into two portions, unit holder 431 and storage tube 432. A pair of strain relief springs 454 and spring holders 452 allow unit holder 431 to pivot about pintles 436, which allows unit holder 431 to pivot relative to storage tube 432. This pivot, opposed by tension within springs 454, allows for the moment of spray shield 420 into the deployed position even if there is interference during deployment of spray shield 420, without causing damage to retractable spray shield assembly 410. Such interference might occur with foreign bodies such as sticks or other plant matter or other obstacles or for other unanticipated reasons.

Figure 24:
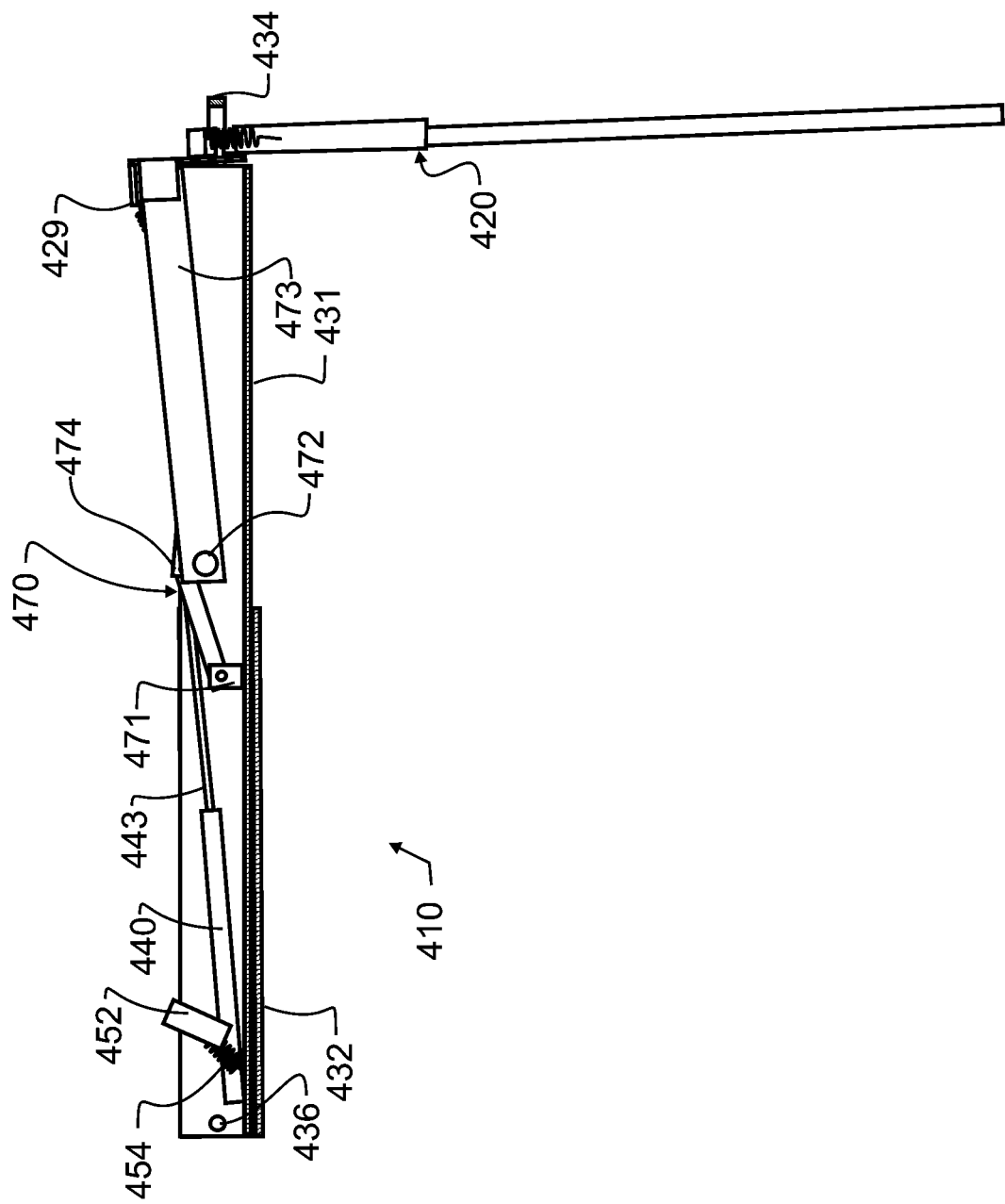
FIG. 24 illustrates the fourth alternative embodiment retractable spray shield for agricultural use of FIG. 22 in a deployed configuration from a side elevational and sectional view taken along section line 24' of FIG. 22.
Figure 25:
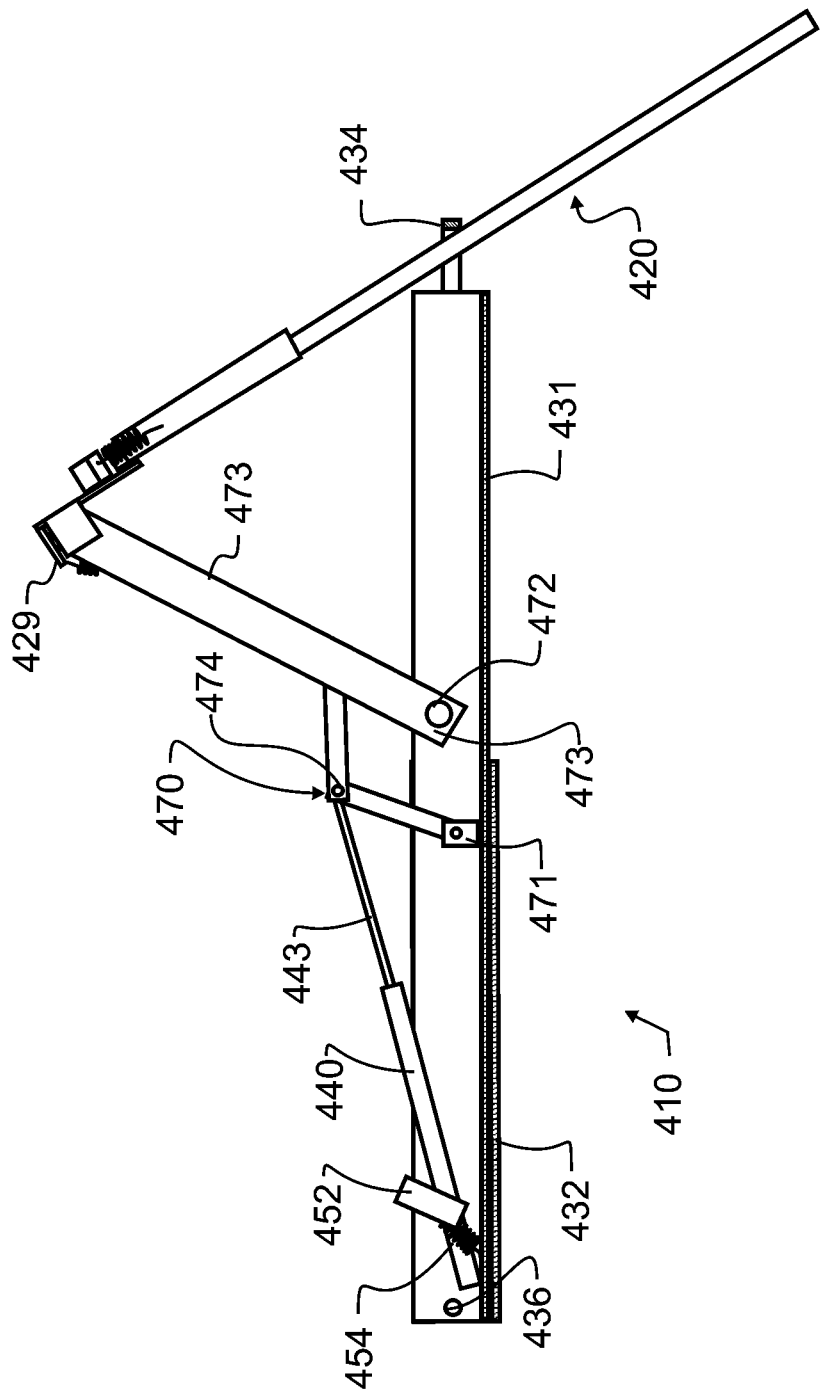
FIG. 25 illustrates the fourth alternative embodiment retractable spray shield for agricultural use of FIG. 22 in an intermediate position between deployed and retracted position from a side elevational and sectional view taken along section line 24' of FIG. 22.
Figure 26:
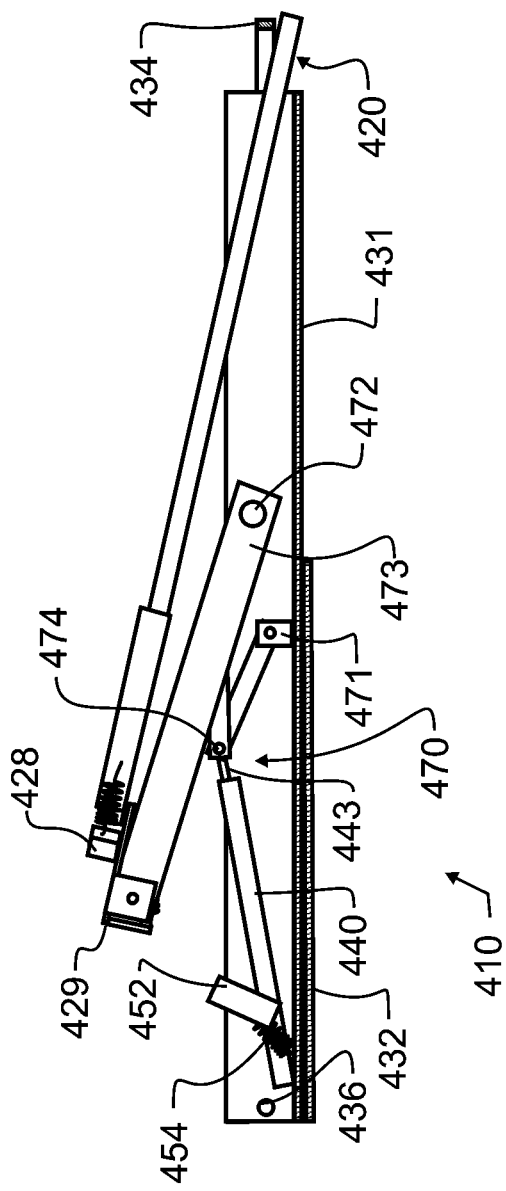
FIG. 26 illustrates the fourth alternative embodiment retractable spray shield for agricultural use of FIG. 22 in a retracted configuration from a side elevational and sectional view taken along section line 26' of FIG. 23.
Figure 27:
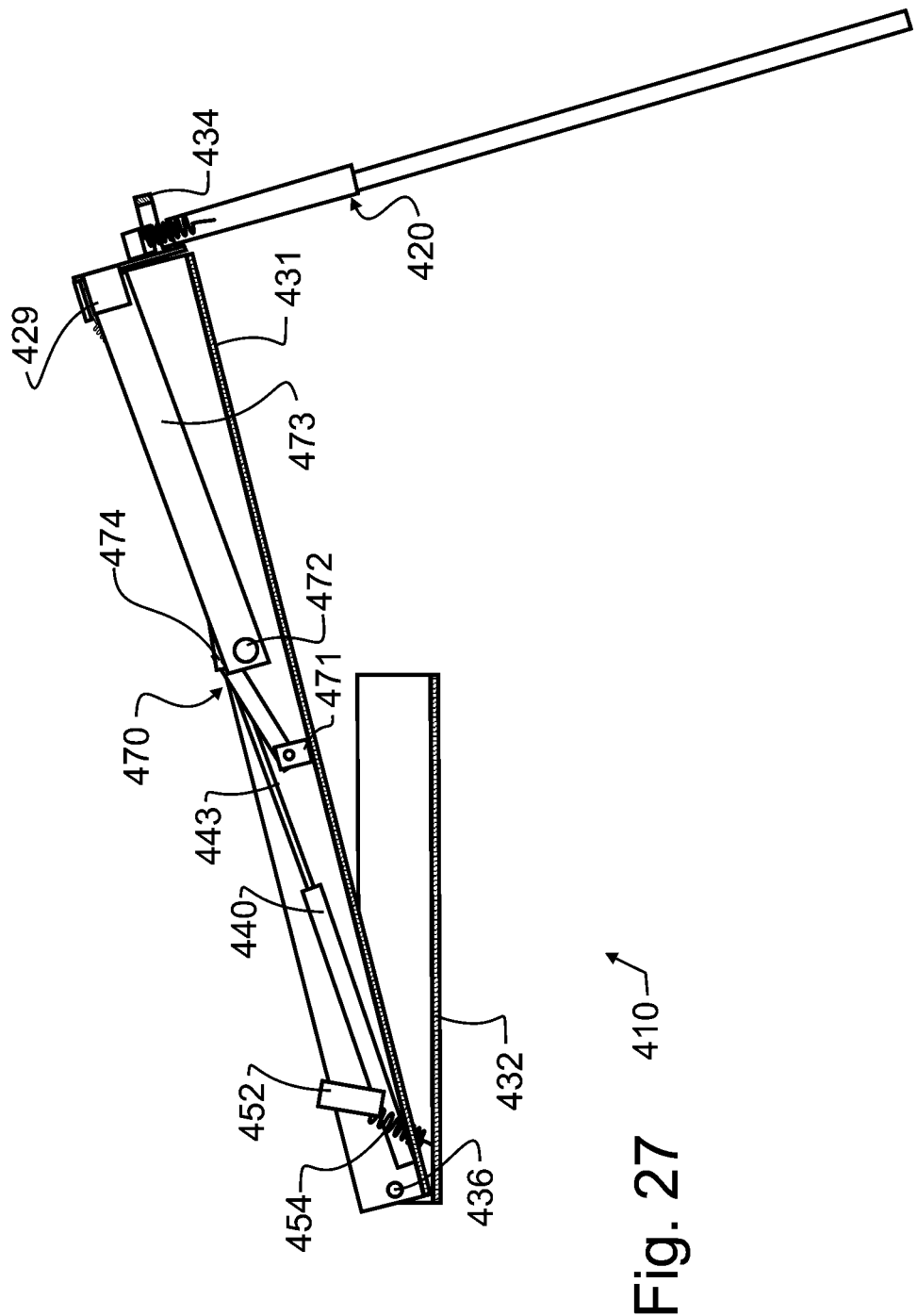
FIG. 27 illustrates the fourth alternative embodiment retractable spray shield for agricultural use of FIG. 22 in a deployed configuration from a side elevational and sectional view similar to that of FIG. 24, showing the strain relief active with the pivot and strain relief springs activated.

In fourth embodiment retractable spray shield assembly 410, the combination simple rectangular frame of unit holder 431 and guard 434 replace the third embodiment storage tube 330. Guard 434 is placed adjacent to and preferably configured to longitudinally co-extend parallel to the length of transfer arm 473 when spray shield 420 is in the deployed position, such as illustrated in FIG. 24. As evident from FIG. 24, when spray shield 420 is in the deployed position, nearly all of the drive components and drive linkage are located within unit holder 431. However, transfer arm 473 rises out of unit holder 431, making it and associated components vulnerable to damage from crops or other obstacles. Guard 434, placed in a position leading transfer arm 473, will deflect such obstacles and thereby protect transfer arm 473 and associated components from unnecessary wear and damage.

Figure 28:
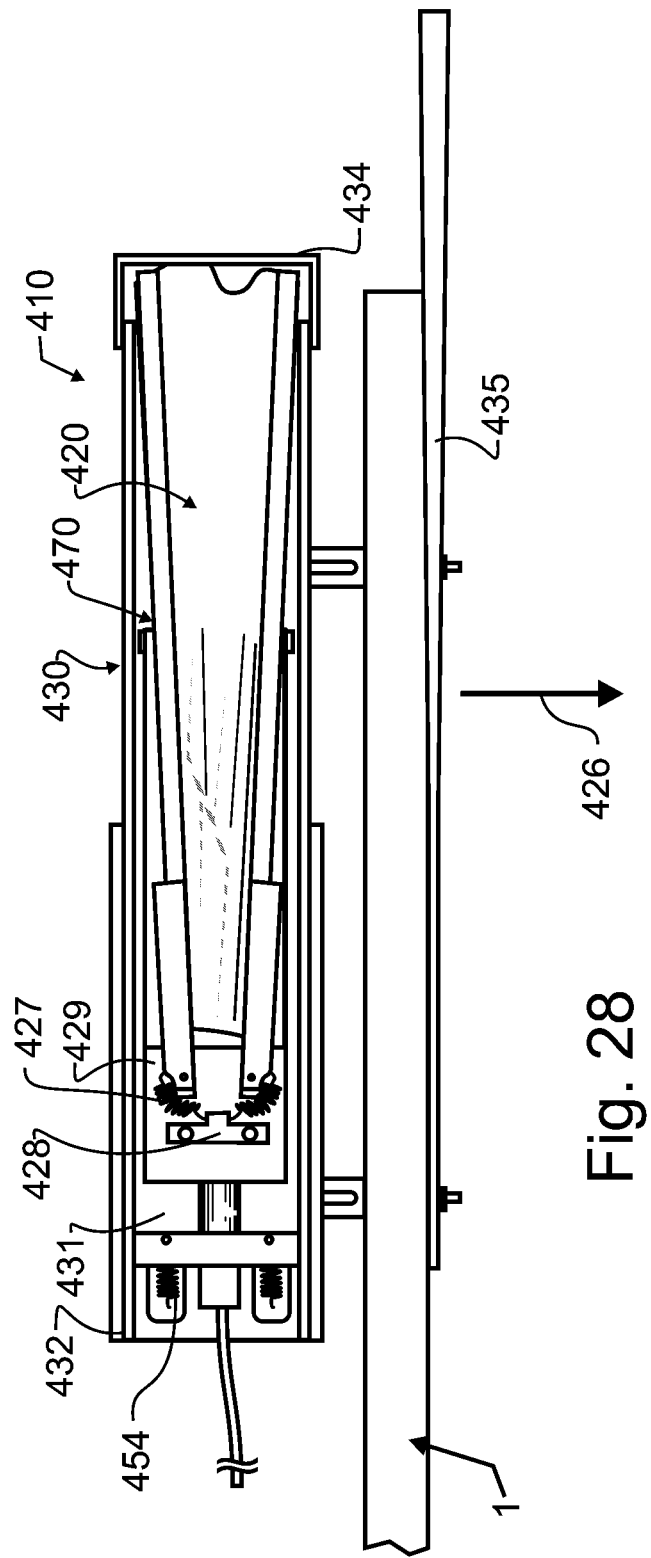
FIG. 28 illustrates the fourth alternative embodiment retractable spray shield for agricultural use of FIG. 22 in a retracted configuration and further affixed to a simplified boom arm from a top plan view.

FIG. 28 illustrate retractable spray shield assembly 410 affixed to a simplified boom arm 1 for purposes of illustration. As illustrated therein, retractable spray shield assembly 410 including guard 434 is bolted to boom arm 1 for exemplary and non-limiting purpose, though a myriad of suitable methods of attachment are known in the mechanical arts that are considered incorporated herein in alternative embodiments.

While the foregoing details what is felt to be the preferred embodiment of the invention, no material limitations to the scope of the claimed invention are intended. Further, features and design alternatives that would be obvious to one of ordinary skill in the art are considered to be incorporated herein. The scope of the invention is set forth and particularly described in the claims herein below.

I claim:

1. In combination, an agricultural spray machine, an agricultural spray boom, and a retractable spray shield for agricultural use,
   the agricultural spray machine having:
      a drive train;
      a liquid tank; and
      a pump receiving a liquid held within said liquid tank;
   the agricultural spray boom having:
      a boom arm extending transverse to a forward direction of travel of said agricultural spray machine; and
      at least one spray nozzle suspended from said boom arm and in fluid communication with said pump;
   the retractable spray shield for agricultural use having:
      a hinge plate;
      a liquid barrier film extending from said hinge plate;
      a clam-shell storage tube defining a path for said hinge plate to reciprocate along, and adapted to receive and conceal said spray shield on an interior when said clam-shell storage tube is closed;
      a deployment and concealment drive having a motor, a drive shaft, and a quadrilateral linkage including a rotating arm and a pushing arm coupled with said drive shaft, said drive shaft rotating said pushing arm relative to said clam-shell storage tube and thereby also rotating said rotating arm relative to said clam-shell storage tube between a first concealed position having said rotating and pushing arms parallel and adjacent to said clam-shell storage tube to a second deployed position having said pushing arm parallel and adjacent to said clam-shell storage tube; and
      a boom arm coupler adapted to couple said retractable spray shield to said agricultural spray boom and simultaneously locate said liquid barrier film in said second deployed position adjacent to and in a spray pattern of said at least one spray nozzle.

2. The combination agricultural spray machine, agricultural spray boom, and retractable spray shield for agricultural use of claim 1, wherein said liquid barrier film further comprises a generally triangular and flaccid liquid barrier film.

3. The combination agricultural spray machine, agricultural spray boom, and retractable spray shield for agricultural use of claim 2, wherein said liquid barrier film further comprises a pair of framing legs, each of said pair of framing legs coupled to an opposed edge of said liquid barrier film.

4. The combination agricultural spray machine, agricultural spray boom, and retractable spray shield for agricultural use of claim 3, further comprising:
   a first pintle coupling a first one of said pair of framing legs to said hinge plate; and
   a second pintle coupling a second one of said pair of framing legs to said hinge plate.

5. The combination agricultural spray machine, agricultural spray boom, and retractable spray shield for agricultural use of claim 4, further comprising:
   a spring guide post intermediate between said first and second pintles; and
   a tension spring wrapped about said spring guide post and configured to operatively stretch said pair of framing legs apart from each other and thereby expand said spray shield toward a planar, generally triangular geometry.

6. The combination agricultural spray machine, agricultural spray boom, and retractable spray shield for agricultural use of claim 1, wherein said quadrilateral linkage further comprises a bottom of said clam-shell storage tube.

7. The combination agricultural spray machine, agricultural spray boom, and retractable spray shield for agricultural use of claim 6, wherein said pushing arm and said rotating arm are each pivotally affixed at spaced-apart pintles to said bottom of said clam-shell storage tube.

8. The combination agricultural spray machine, agricultural spray boom, and retractable spray shield for agricultural use of claim 7, wherein said quadrilateral linkage further comprises said hinge plate.

9. The combination agricultural spray machine, agricultural spray boom, and retractable spray shield for agricultural use of claim 8, wherein said pushing arm and said rotating arm are each pivotally affixed distal to said bottom of said clam-shell storage tube at spaced-apart pintles to said hinge plate.

10. The combination agricultural spray machine, agricultural spray boom, and retractable spray shield for agricultural use of claim 1, wherein said agricultural spray machine further comprises:
   an operator cab configured to support an operator and provide actuatable operator controls; and
   an electrical system configured to selectively provide electrical power to said deployment and concealment drive responsive to activation of at least one of said operator controls.

\* \* \* \* \*